US012282726B2

(12) United States Patent
Summerbell et al.

(10) Patent No.: US 12,282,726 B2
(45) Date of Patent: Apr. 22, 2025

(54) METHODS AND DEVICES FOR PROVIDING SELECTABLE AND EDITABLE DYSLEXIC-FRIENDLY READABLE IMAGES

(71) Applicants: Hillary Patience Summerbell, Lewes, DE (US); Jeremy Dunsworth, Seattle, WA (US)

(72) Inventors: Hillary Patience Summerbell, Lewes, DE (US); Jeremy Dunsworth, Seattle, WA (US)

(73) Assignee: Summerbell Reading Method, LLC, Lewes, DE (US)

(*) Notice: Subject to any disclaimer, the term of this patent is extended or adjusted under 35 U.S.C. 154(b) by 0 days.

(21) Appl. No.: 17/062,541

(22) Filed: Oct. 2, 2020

(65) Prior Publication Data

US 2021/0286931 A1 Sep. 16, 2021

Related U.S. Application Data

(60) Provisional application No. 62/988,729, filed on Mar. 12, 2020, provisional application No. 63/074,448, filed on Sep. 3, 2020, provisional application No. 63/080,714, filed on Sep. 19, 2020.

(51) Int. Cl.

| | |
|---|---|
| ***G06F 40/00*** | (2020.01) |
| ***G06F 40/103*** | (2020.01) |
| ***G06F 40/166*** | (2020.01) |

(52) U.S. Cl.

CPC .......... *G06F 40/103* (2020.01); *G06F 40/166* (2020.01)

(58) Field of Classification Search

CPC .............................. G06F 40/103; G06F 40/166

See application file for complete search history.

(56) References Cited

U.S. PATENT DOCUMENTS

| | | | | |
|---|---|---|---|---|
| 5,022,081 | A | 6/1991 | Hirose | |
| 5,892,592 | A | 4/1999 | Adachi et al. | |
| 6,230,170 | B1 * | 5/2001 | Zellweger | G06F 40/131 345/646 |
| 6,279,017 | B1 * | 8/2001 | Walker | G09B 17/04 715/201 |
| 6,584,479 | B2 * | 6/2003 | Chang | G06F 40/103 715/705 |
| 6,594,664 | B1 | 7/2003 | Estrada | |
| 7,036,075 | B2 * | 4/2006 | Walker | G09B 17/04 715/201 |

(Continued)

OTHER PUBLICATIONS

Screen captures from YouTube video clip entitled "Wrapping text around images in MS Word," 2 pages, uploaded on Jan. 5, 2012 by user "osdlsbuvideos". Retrieved from Internet: < https://www.youtube.com/watch?v=B4JKiIAIBLY>.*

(Continued)

*Primary Examiner* — William L Bashore
*Assistant Examiner* — David Faber
(74) *Attorney, Agent, or Firm* — Raymond Van Dyke; Van Dyke Intellectual Property Law

(57) ABSTRACT

Dyslexic-friendly, readable images are generated from linear formatted images. Each dyslexic-friendly, readable image may include one or more positioned, non-linear (e.g., curved) boundaries and a plurality of textual objects, where each object is positioned at a distance from the boundaries and follows a boundary. The dyslexic-friendly, readable images can be edited.

24 Claims, 22 Drawing Sheets

(56) References Cited

U.S. PATENT DOCUMENTS

| | | | | |
|---|---|---|---|---|
| 7,188,306 | B1 * | 3/2007 | Chang | G06F 40/169 707/999.102 |
| 8,584,012 | B1 | 11/2013 | Orshanskly | |
| 10,372,788 | B2 * | 8/2019 | Landau | G09B 17/00 |
| 2001/0048849 | A1 | 12/2001 | Rinninger | |
| 2002/0118230 | A1 | 8/2002 | Card | |
| 2003/0215775 | A1 | 11/2003 | Bizziocchi | |
| 2004/0253568 | A1 * | 12/2004 | Shaver-Troup | G09B 17/00 434/178 |
| 2005/0142522 | A1 | 6/2005 | Kullok et al. | |
| 2008/0077879 | A1 * | 3/2008 | Black | G06F 9/451 715/810 |
| 2008/0238927 | A1 | 10/2008 | Mansfield | |
| 2011/0111377 | A1 | 5/2011 | Dekkers | |
| 2011/0179345 | A1 * | 7/2011 | Capela | G06F 40/103 715/209 |
| 2012/0311438 | A1 | 12/2012 | Cranfill | |
| 2015/0042662 | A1 | 2/2015 | Latorre-Martinez et al. | |
| 2015/0082238 | A1 * | 3/2015 | Meng | G06F 3/04855 715/840 |
| 2015/0186346 | A1 * | 7/2015 | Mesguich Havilio | G06F 3/0488 715/256 |
| 2016/0301828 | A1 | 10/2016 | Niazi | |

OTHER PUBLICATIONS

Screen captures from YouTube video clip entitled "How to bold text in MS Word," 2 pages, uploaded on Nov. 6, 2018 by user "MDTechVideos". Retrieved from Internet: < https://www.youtube.com/watch?v=yrn_leajAZA>.*

Milliman, Hayley, "How to Make Letters Curve in Microsoft Word", Nov. 29, 2018, 6 pages + 2 google pages, 8 pages total.*

Ali, Sheraz, "How to Arch your Text in Word—Bend your Words With WordArt Magic", Jun. 12, 2019.*

Youtube, "CircleText"—Youtube video, online Jun. 13, 2018, https://www.youtube.com/watch?v=Sv62C-OKm7E (2 pages).*

Adobe Community, "How to curve text within a paragraph", online as of Jun. 4, 2018, 14 pages https://community.adobe.com/t5/indesign-discussions/how-to-curve-text-within-a-paragraph/m-p/9916708.*

"IPad Apps for Learners with Dyslexia/Reading and Writing Difficulties" https://www.callscotland.org.uk/common-assets/images/posters/poster16-large.jpg.

https://www.mayoclinic.org/diseases-conditions/dyslexia/symptoms-causes/syc-20353552.

Am Sam I Am, 2019, T, Rabe, Penguin Random House LLC.

Inman, John Lawrence, "Another Way to Understand Gifted and Dyslexic: Hypothetical Transformation Via an Indigenous Worldview", Dissertation Submitted to Fielding Graduate University. 2015 (2015), pp. 1-96, Retrieved on Jul. 5, 2020 from <http://jwww.johninmandialogue.com/wp-content/uploads//2015/03/Inman-Dissertation-Final-Manuscript-with-edits-Publish.pdf>.

* cited by examiner

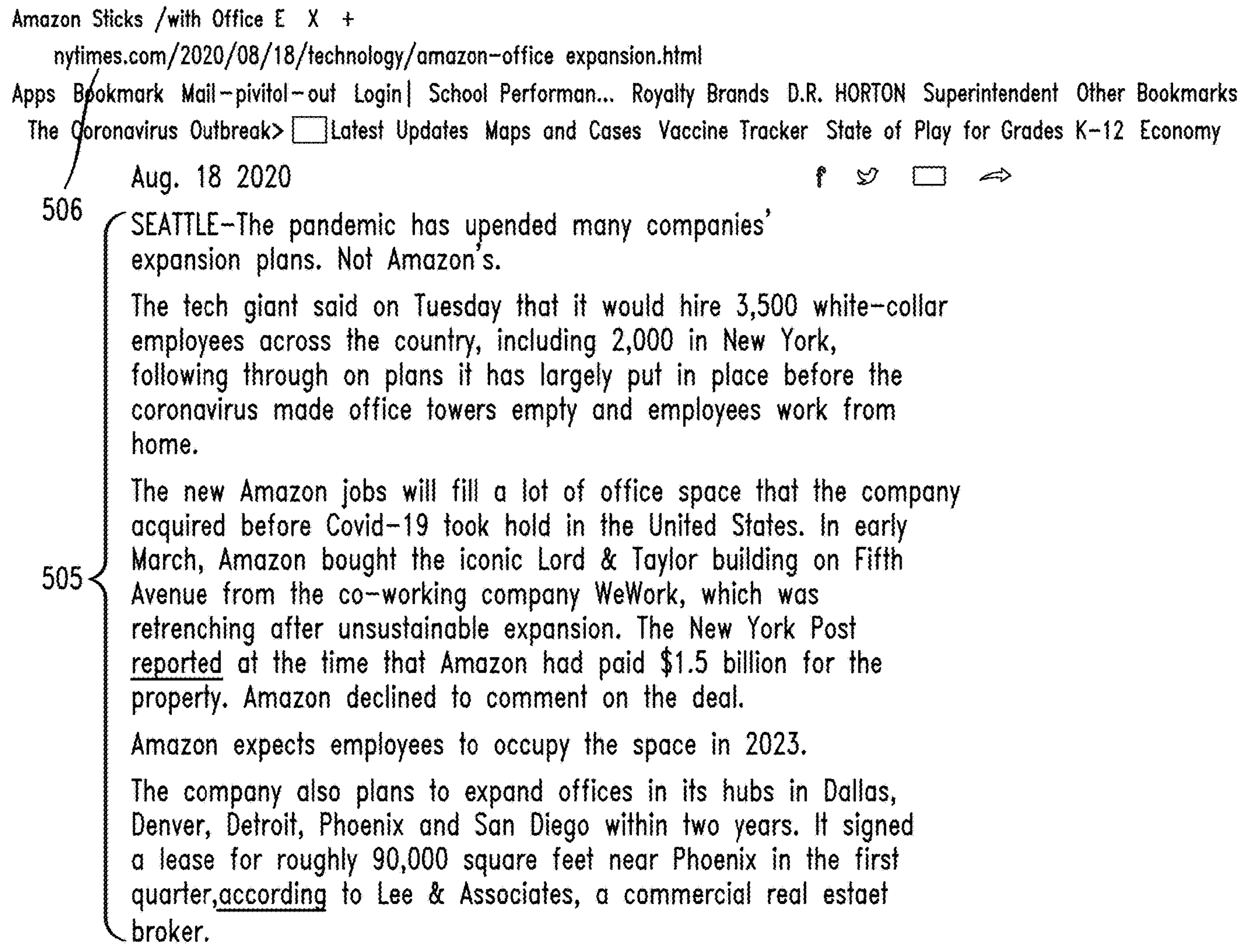

FIG. 5B

Amazon Sticks /with Office E  X  +
nytimes.com/2020/08/18/technology/amazon-office expansion.html
Apps Bookmark Mail-pivitol-out Login| School Performan... Royalty Brands D.R. HORTON Superintendent Other Bookmarks
The Coronavirus Outbreak> ☐Latest Updates Maps and Cases Vaccine Tracker State of Play for Grades K-12 Economy Aug. 18 2020

506

SEATTLE—The pandemic has upended many companies' expansion plans. Not Amazon's.

The tech giant said on Tuesday that it would hire 3,500 white-collar employees across the country, including 2,000 in New York, following through on plans it has largely put in place before the coronavirus made office towers empty and employees work from home.

The new Amazon jobs will fill a lot of office space that the company acquired before Covid-19 took hold in the United States. In early March, Amazon bought the iconic Lord & Taylor building on Fifth Avenue from the co-working company WeWork, which was retrenching after unsustainable expansion. The New York Post reported at the time that Amazon had paid $1.5 billion for the property. Amazon declined to comment on the deal.

Amazon expects employees to occupy the space in 2023.

The company also plans to expand offices in its hubs in Dallas, Denver, Detroit, Phoenix and San Diego within two years. It signed a lease for roughly 90,000 square feet near Phoenix in the first quarter, according to Lee & Associates, a commercial real estaet broker.

505

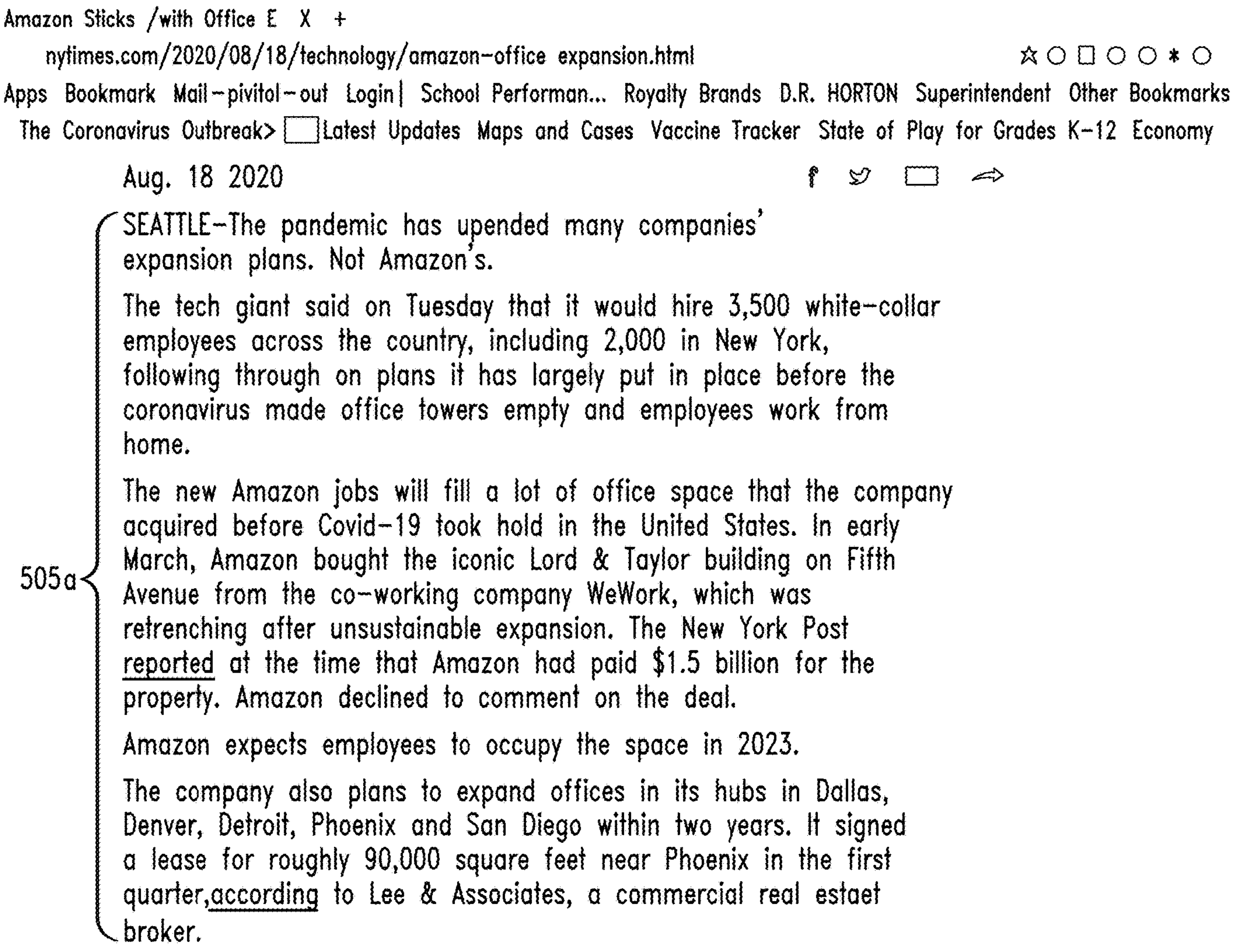

FIG. 5C

Amazon Sticks /with Office  E   X   + nytimes.com/2020/08/18/technology/amazon-office expansion.html                    ☆ ○ □ ○ ○ ∗ ○

Apps Bookmark Mail-pivitol-out Login| School Performan... Royalty Brands D.R. HORTON Superintendent Other Bookmarks The Coronavirus Outbreak> ☐Latest Updates Maps and Cases Vaccine Tracker State of Play for Grades K-12 Economy Aug. 18 2020

SEATTLE—The pandemic has upended many companies' expansion plans. Not Amazon's.

The tech giant said on Tuesday that it would hire 3,500 white-collar employees across the country, including 2,000 in New York, following through on plans it has largely put in place before the coronavirus made office towers empty and employees work from home.

The new Amazon jobs will fill a lot of office space that the company acquired before Covid-19 took hold in the United States. In early March, Amazon bought the iconic Lord & Taylor building on Fifth Avenue from the co-working company WeWork, which was retrenching after unsustainable expansion. The New York Post reported at the time that Amazon had paid $1.5 billion for the property. Amazon declined to comment on the deal.

Amazon expects employees to occupy the space in 2023.

The company also plans to expand offices in its hubs in Dallas, Denver, Detroit, Phoenix and San Diego within two years. It signed a lease for roughly 90,000 square feet near Phoenix in the first quarter, according to Lee & Associates, a commercial real estaet broker.

505a

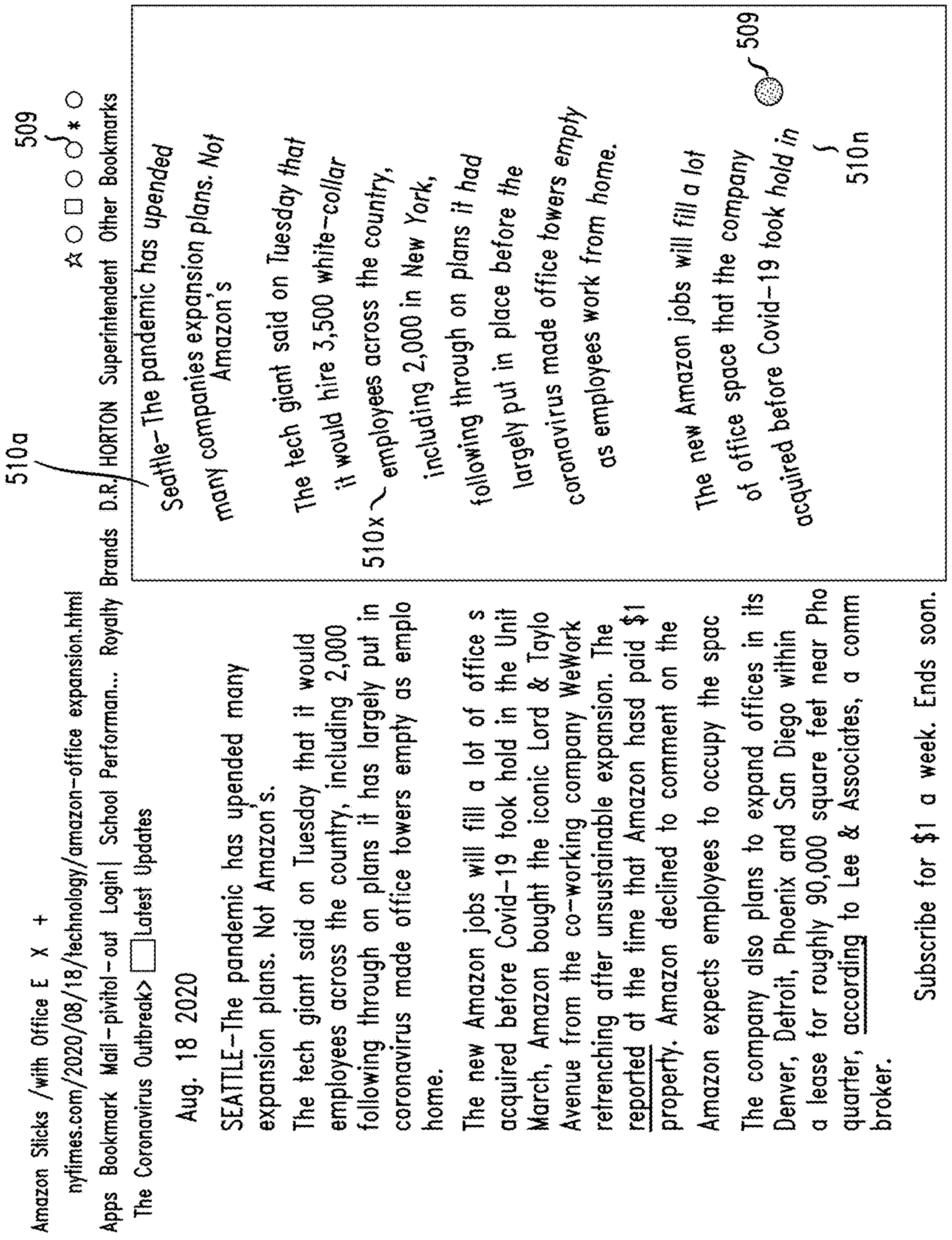

FIG. 5E

Amazon Sticks /with Office E  X  +
nytimes.com/2020/08/18/technology/amazon-office expansion.html
Apps  Bookmark  Mail-pivitol-out  Login| School Performan... Royalty Brands  D.R. HORTON Superintendent  Other Bookmarks
The Coronavirus Outbreak> ☐ Latest Updates

☆ ○ ☐ ○ ⚹ ○
509

Aug. 18 2020

SEATTLE—The pandemic has upended many
expansion plans. Not Amazon's.

The tech giant said on Tuesday that it would
employees across the country, including 2,000
following through on plans it has largely put in
coronavirus made office towers empty as emplo
home.

The new Amazon jobs will fill a lot of office s
acquired before Covid-19 took hold in the Unit
March, Amazon bought the iconic Lord & Taylo
Avenue from the co-working company WeWork
retrenching after unsustainable expansion. The
reported at the time that Amazon hasd paid $1
properly. Amazon declined to comment on the
Amazon expects employees to occupy the spac The company also plans to expand offices in its
Denver, Detroit, Phoenix and San Diego within
a lease for roughly 90,000 square feet near Pho
quarter, according to Lee & Associates, a comm
broker.

Subscribe for $1 a week. Ends soon.

510a

Seattle—The pandemic has upended
many companies expansion plans. Not
Amazon's

The tech giant said on Tuesday that
it would hire 3,500 white-collar
510x — employees across the country,
including 2,000 in New York,
following through on plans it had
largely put in place before the
coronavirus made office towers empty
as employees work from home.

The new Amazon jobs will fill a lot
of office space that the company
acquired before Covid-19 took hold in
510n

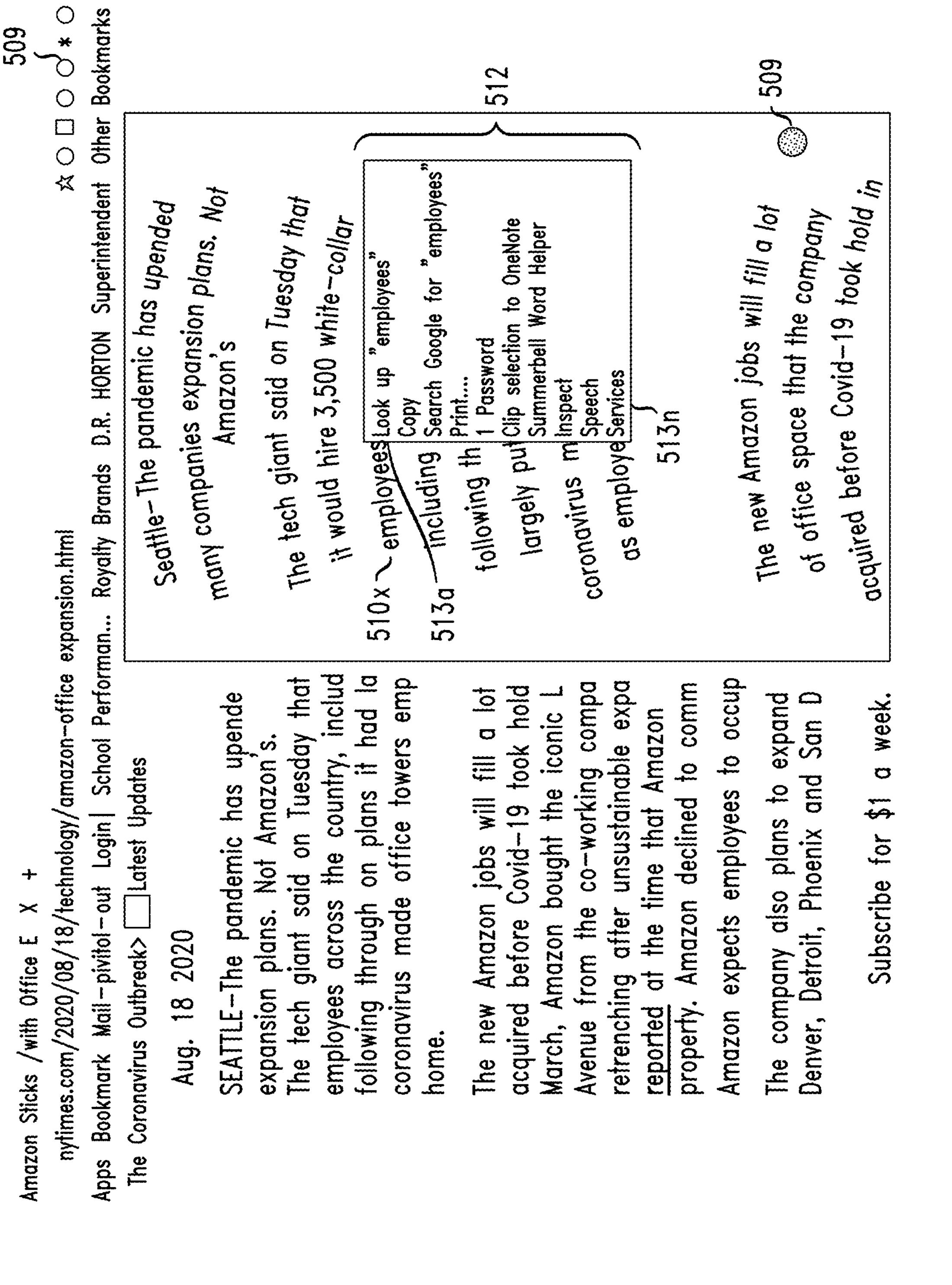

Amazon Sticks /with Office E   X   +
nytimes.com/2020/08/18/technology/amazon-office expansion.html
Apps  Bookmark  Mail-pivitol-out  Login|  School Performan...  Royalty Brands  D.R. HORTON  Superintendent  Other Bookmarks
The Coronavirus Outbreak>  ☐Latest Updates                                                 ☆ ○ ☐ ♂ ✱ ○

Aug. 18 2020

SEATTLE—The pandemic has upended
many companies expansion plans. Not Amazon's.
The tech giant said on Tuesday that
it would hire 3,500 white-collar
employees across the country, includ-
following through on plans it had la
coronavirus made office towers emp
home.

The new Amazon jobs will fill a lot
acquired before Covid-19 took hold
March, Amazon bought the iconic L
Avenue from the co-working compa
retrenching after unsustainable expa
reported at the time that Amazon
property. Amazon declined to comm
Amazon expects employees to occup The company also plans to expand
Denver, Detroit, Phoenix and San D Subscribe for $1 a week.

Context menu items (512):
- Look up "employees"
- Copy
- Search Google for "employees"
- Print....
- 1 Password
- Clip selection to OneNote
- Summerbell Word Helper
- Inspect
- Speech
- Services 510x — employees
513a — including
513n

509

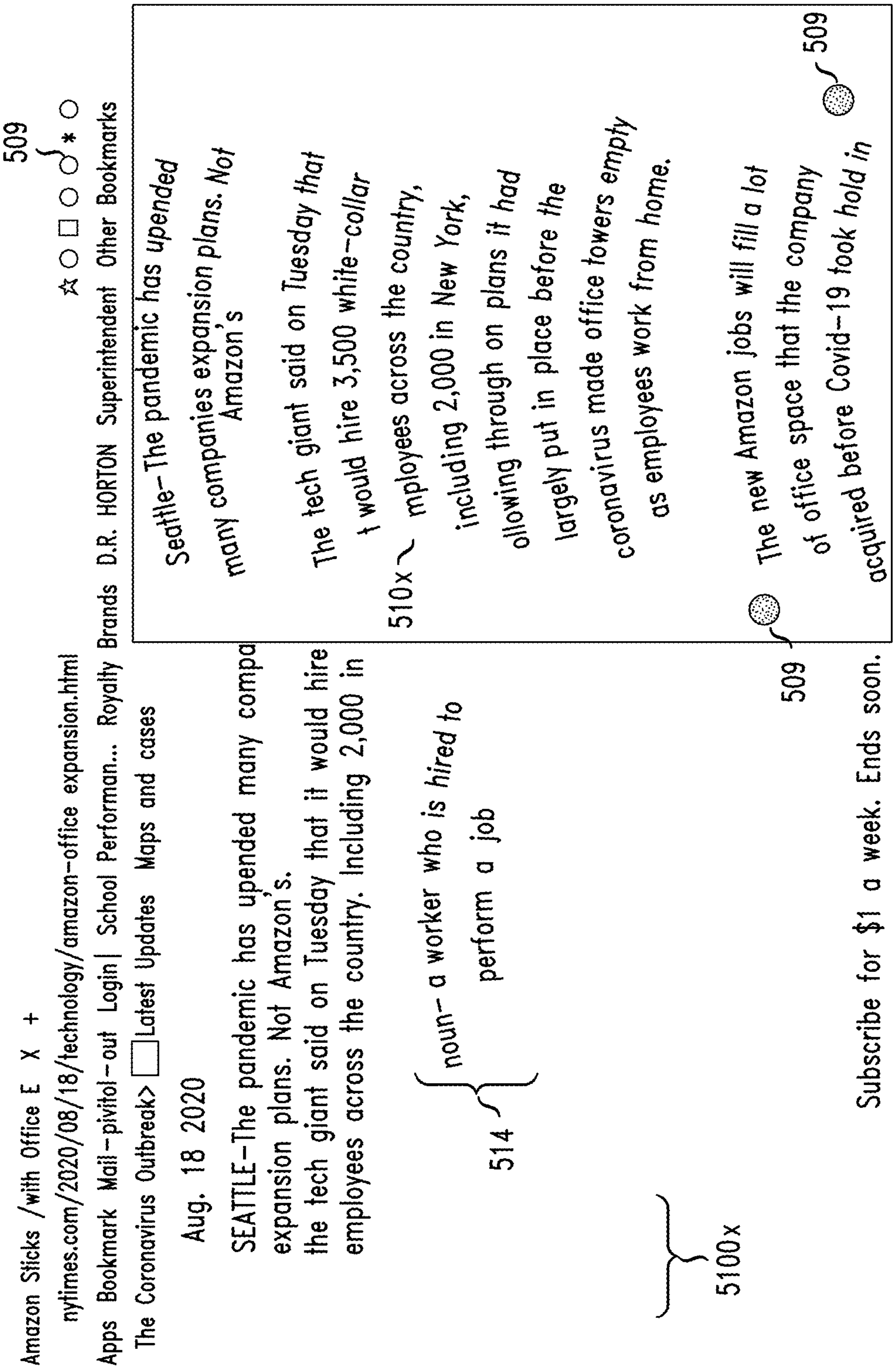

FIG. 5G

Amazon Sticks /with Office E X +
nytimes.com/2020/08/18/technology/amazon-office expansion.html
☆ ○ □ ○ ○ * ○
Apps Bookmark Mail-pivitol-out Login| School Performan... Royalty Brands D.R. HORTON Superintendent Other Bookmarks
The Coronavirus Outbreak> ☐ Latest Updates Maps and cases — 509

Aug. 18 2020

SEATTLE—The pandemic has upended many compa
expansion plans. Not Amazon's.
the tech giant said on Tuesday that it would hire
employees across the country. Including 2,000 in noun— a worker who is hired to perform a job
514

5100x

---

Seattle—The pandemic has upended
many companies expansion plans. Not
Amazon's

The tech giant said on Tuesday that
t would hire 3,500 white-collar
510x — mployees across the country,
including 2,000 in New York,
ollowing through on plans it had
largely put in place before the
coronavirus made office towers empty
as employees work from home.

The new Amazon jobs will fill a lot
of office space that the company
acquired before Covid-19 took hold in

509

Subscribe for $1 a week. Ends soon.

*FIG.* 5H
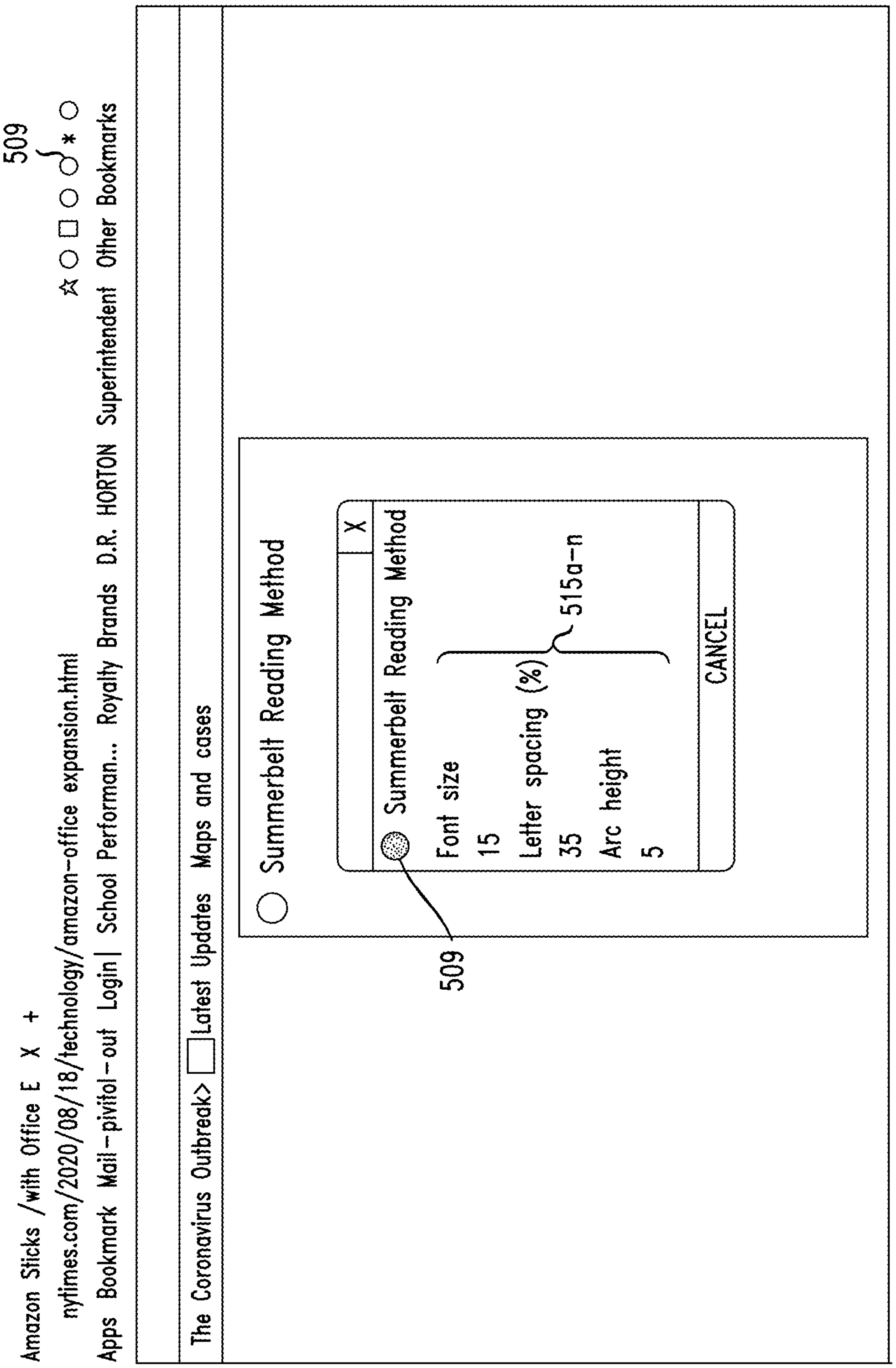

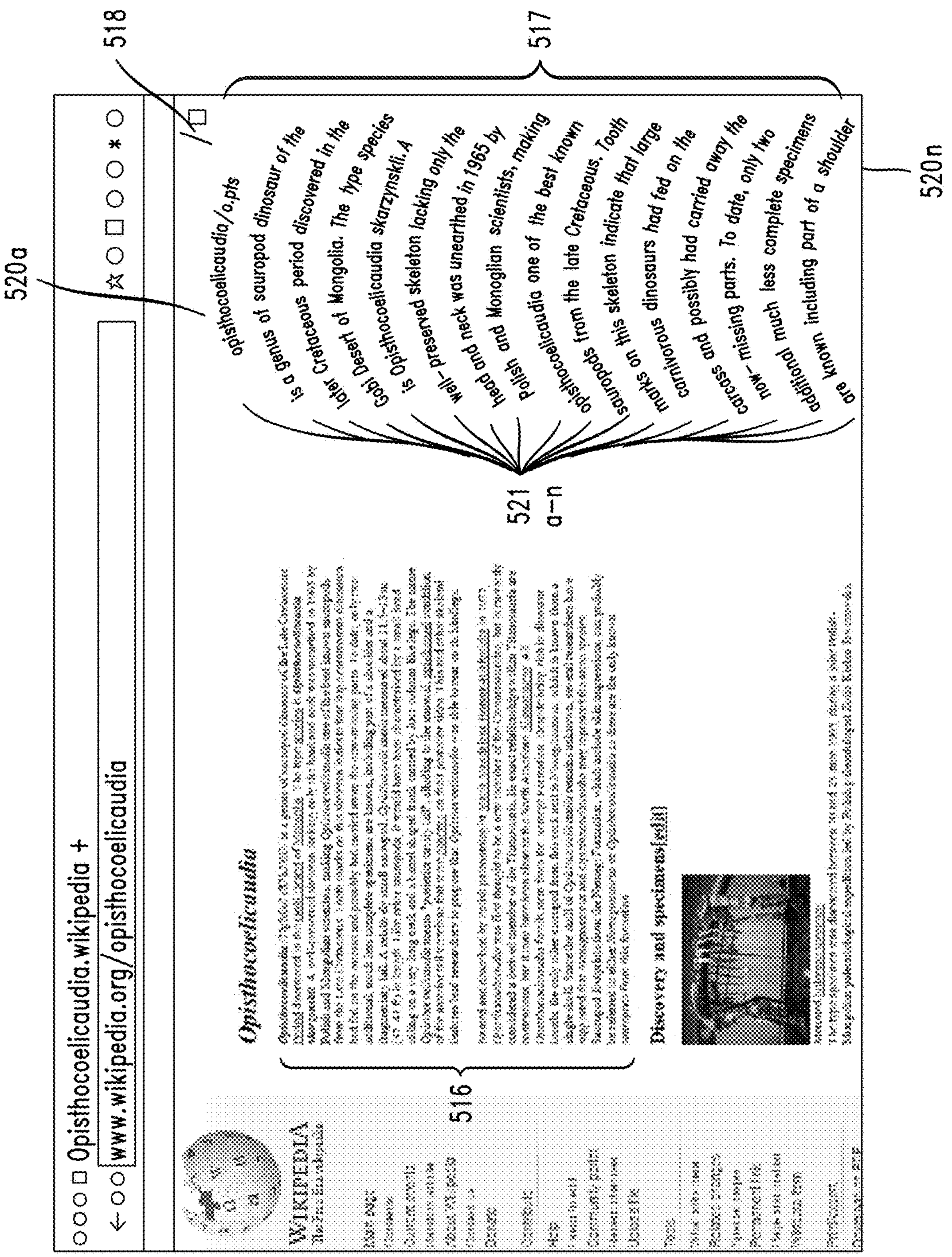

FIG. 5J opisthocoelicaudia/o.pts is a genus of sauropod dinosaur of the
later Cretaceous period discovered in the
Gobi Desert of Mongolia. The type species
is Opisthocoelicaudia skarzynskii. A
Well-preserved skeleton lacking only the
head and neck was unearthed in 1965 by
Polish and Mongolian scientists, making
opisthocoelicaudia one of the best known
sauropods from the late Cretaceous. Tooth
marks on this skeleton indicate that large
carnivorous dinosaurs had fed on the
carcass and possibly had carried away the
now-missing parts. To date, only two
additional much less complete specimens
are known including part of a shoulder

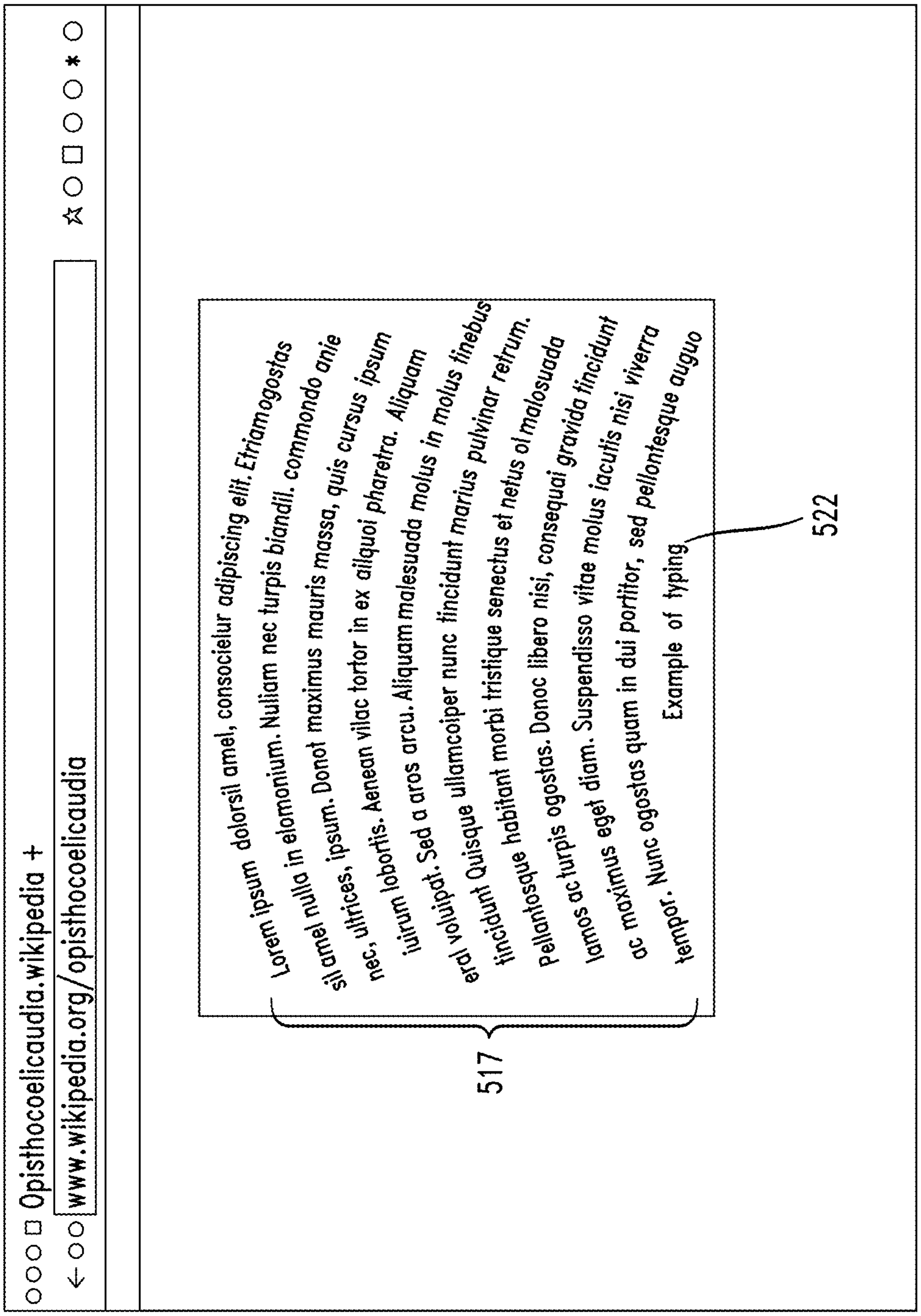

FIG. 5L

○○○ □ Opisthocoelicaudia.wikipedia +
← ○○ www.wikipedia.org/opisthocoelicaudia     ☆ ○ □ ○ ○ *  ○

Lorem ipsum dolorsil amel, consocielur adipiscing elit. Etriamogostas sil amel nulla in elomonium. Nuliam nec turpis biandil. commondo anie nec, ultrices, ipsum. Donot maximus mauris massa, quis cursus ipsum iuirum lobortis. Aenean vilac tortor in ex ailquoi pharetra. Aliquam eral voluipat. Sed a aros arcu. Aliquam malesuada molus in molus finebus tincidunt Quisque ullamcoiper nunc tincidunt marius pulvinar retrum. Pellantosque habitant morbi tristique senectus et netus ol malosuada lamos ac turpis ogostas. Donoc libero nisi, consequai gravida tincidunt ac maximus egel diam. Suspendisso vitae molus iacutis nisi viverra tempor. Nunc ogostas quam in dui portitor, sed pellontesque auguo Example of typing — 522

517

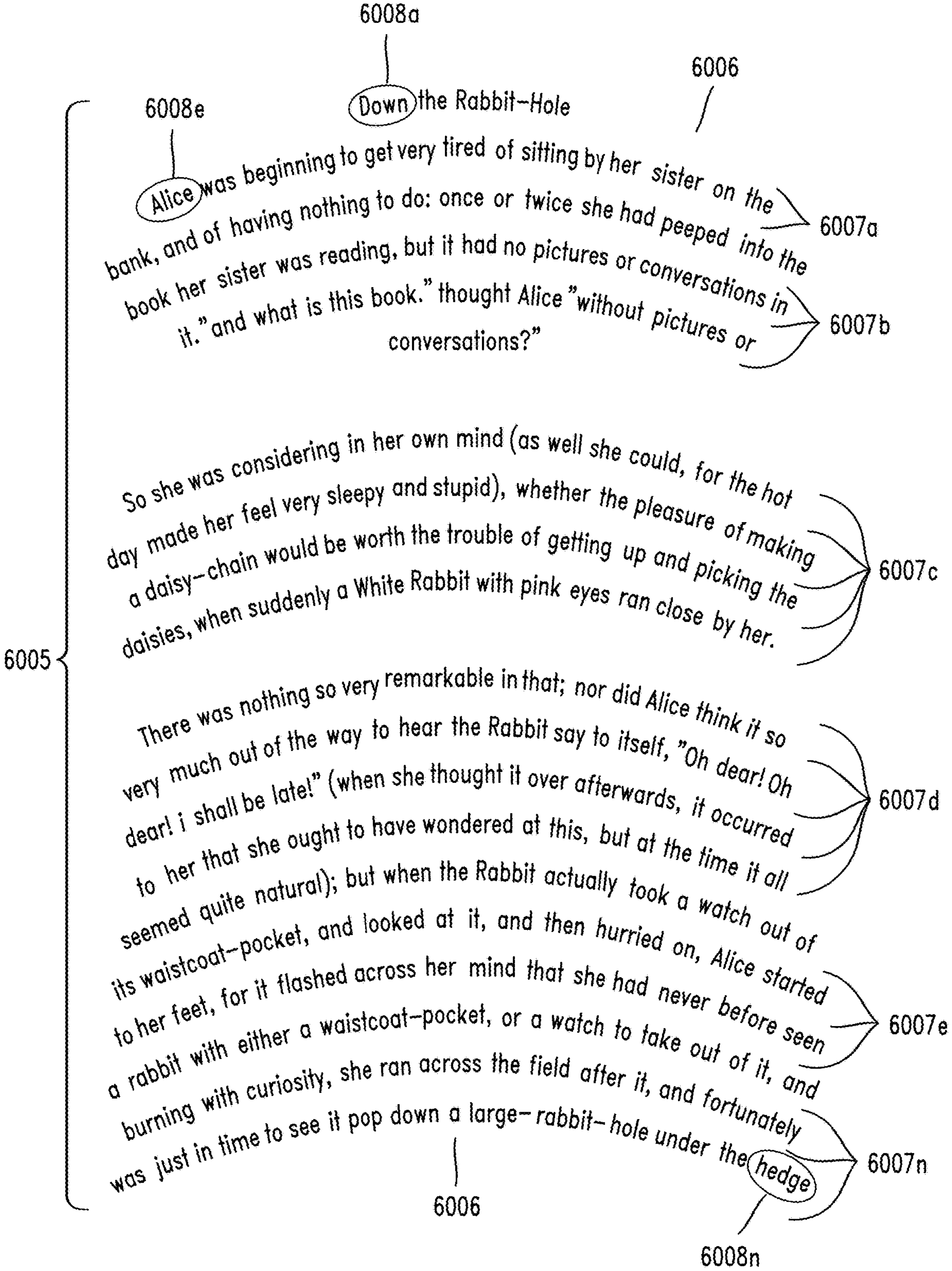

FIG. 6C

Down the Rabbit-Hole

Alice was beginning to get very tired of sitting by her sister on the bank, and of having nothing to do: once or twice she had peeped into the book her sister was reading, but it had no pictures or conversations in it."and what is this book." thought Alice "without pictures or conversations?"

So she was considering in her own mind (as well she could, for the hot day made her feel very sleepy and stupid), whether the pleasure of making a daisy-chain would be worth the trouble of getting up and picking the daisies, when suddenly a White Rabbit with pink eyes ran close by her.

There was nothing so very remarkable in that; nor did Alice think it so very much out of the way to hear the Rabbit say to itself, "Oh dear! Oh dear! i shall be late!" (when she thought it over afterwards, it occurred to her that she ought to have wondered at this, but at the time it all seemed quite natural); but when the Rabbit actually took a watch out of its waistcoat-pocket, and looked at it, and then hurried on, Alice started to her feet, for it flashed across her mind that she had never before seen a rabbit with either a waistcoat-pocket, or a watch to take out of it, and burning with curiosity, she ran across the field after it, and fortunately was just in time to see it pop down a large-rabbit-hole under the hedge.

(S) Summerbell Typing Tool      [Speech to Text]  [Copy Text]  [Print]

T (S) Summerbell Typing Tool      [Speech to Text]  [Copy Text]  [Print]

Th (S) Summerbell Typing Tool      [Speech to Text]  [Copy Text]  [Print]

Thi (S) Summerbell Typing Tool    [Speech to Text]  [Copy Text]  [Print]

```
                              This
```

(S) Summerbell Typing Tool    [Speech to Text]  [Copy Text]  [Print]

This is a sample of typing in the typing too (S) Summerbell Typing Tool    [Speech to Text]  [Copy Text]  [Print]

This is a sample of typing in the typing tool.

METHODS AND DEVICES FOR PROVIDING SELECTABLE AND EDITABLE DYSLEXIC-FRIENDLY READABLE IMAGES

INTRODUCTION

The present application claims the benefit of priority to U.S. provisional application 62/988,729 filed Mar. 12, 2020 ("'729 Application"), U.S. Provisional Application No. 63/074,448 filed Sep. 3, 2020 ("'448 Application"), and U.S. Provisional Application 63/080,714 filed Sep. 19, 2020 ("'714 Application"). Further, the present application is related to U.S. Non-provisional application Ser. No. 16/867,388 (the "'388 Application") filed May 5, 2020. The present application incorporates by reference the entire disclosures of the '729, '448, '714 and '388Applications, including drawings, as if each were set forth in full herein.

FIELD OF THE INVENTION

The present application relates to the conversion of text and other symbols into images that can be understood by individuals that have learning differences, such as dyslexia.

BACKGROUND OF THE INVENTION

This section introduces aspects that may be helpful to facilitate a better understanding of the described invention(s). Accordingly, the statements in this section are to be read in this light and are not to be understood as admissions about what is, or what is not, in the prior art.

For an individual with learning differences, such as dyslexia, it is difficult, if not impossible, to read text (letters, words, numbers, symbols) as it is currently presented in a conventional format. For example, conventional text is displayed substantially on, or between, one or more straight, parallel horizontal lines (i.e., a "linear" format). This format is used to present text in online web sites, social media web sites, books, magazines, signs, etc. regardless of language. Even if such lines are not visible, the text is still shown spaced substantially on, or from one or more boundaries as if the lines were visible. This conventional, linear format is very difficult for a person with a learning difference because they are unable to break up words or syllables of words or text of any kind in a linear format into separate components, cannot sound out syllabic components of a word, or break up a word or a math equation in a linear format. To a person with a learning difference, words, sentences and paragraphs in a linear format many times appears as one single, combined image.

This problem exists whether the text is represented on a piece of paper, computer screen or printed page. The conventional ways and means of processing information (e.g., text) using two-dimensional, linear lines, boundaries and paragraphs adversely affects many aspects of the daily life of a person with a learning difference (e.g., a dyslexic).

For example, when a dyslexic sees a word in a linear format they do not recognize or multiple lines of text, a dyslexic may go "blank" (known as "word blindness"). This word blindness may also cause the dyslexic problems with following a sequence of instructions, such as a recipe. Further, dyslexics have a hard time remembering numbers or letters in their proper sequence in a linear format, which makes performing precise math calculations very challenging to say the least.

Conservative estimates are that dyslexia alone affects 10% of the world's population, and perhaps up to 17%.

Accordingly, there is a need for better methods and systems that allow people with a learning difference, such as dyslexia, to read and understand text and other symbols.

SUMMARY OF THE INVENTION

The inventors (one of which is dyslexic) have discovered that providing an image in a non-linear format substantially improves the ability of a person with a learning difference, such as dyslexia, to read and comprehend the content of the image (e.g., the text or other symbol). In one embodiment, an inventive for converting linear formatted text into a dyslexic-friendly readable image using an electronic device may comprise: electronically reading or receiving linear formatted text; electronically converting the read or received, linear formatted text into the non-linear, dyslexic-friendly readable image using an electronic device, where the converted image comprises, (i) a surface or background portion; (ii) one or more positioned non-linear boundaries, and (iii) one or more textual objects, where the one or more textual objects are positioned such that each object is at a first distance from the one or more positioned non-linear boundaries. Such a first distance may be an equal distance from one or more positioned non-linear boundaries, of the one or more positioned boundaries, that are located above and below the one or more objects, or the first distance may be an equal distance from a positioned non-linear boundary, of the one or more positioned boundaries, that is located above or below the one or more objects.

Each of the one or more positioned boundaries may be separated by a second distance, and the first distance may be substantially ⅓ of the second distance.

The exemplary method may further comprise adjusting a slope of the non-linear boundaries, for example.

Further, the method may additionally comprise electronically selecting one or more objects within the non-linear, dyslexic-friendly readable image; electronically presenting a list of functional or informative indicators; electronically selecting an indicator from the list; and completing a function or displaying information associated with selected indicator.

In an additional embodiment, the method may further comprise presenting a definition of selected one or more objects.

An exemplary method may include the steps set forth above, and in addition, the steps of electronically selecting one or more objects within a non-linear, dyslexic-friendly readable image, and emphasizing the one of more selected objects, and/or de-emphasizing non-selected objects within the non-linear, dyslexic-friendly readable image.

Another exemplary method may include the steps set forth above, and in addition, the steps of displaying an edit indicator, selecting an object from one or more objects to be edited, editing the object, and visually indicating the selected object is being edited by presenting an image editing indicator.

In any of the embodiments described above, a method may comprise re-converting the non-linear, dyslexic-friendly image back to the linear formatted text.

It should be understood that the one or more objects may comprise one or more of grammatical letters, words, numbers, or symbols, where a grammatical letter, word or symbol may comprise a character in a language.

In yet another method, after linear formatted words have been typed into a computer using a keyboard, for example, these words may be converted into a non-linear image that includes positioning one or more of objects substantially in a middle of a display.

In addition to inventive methods, the inventors also provide inventive electronic devices that are operable to convert linear formatted text into a dyslexic-friendly readable image. One such device may comprise an electronic processor that may be operable to execute stored instructions to electronically read or receive linear formatted text, and electronically convert the read or received, linear formatted text into the non-linear, dyslexic-friendly readable image, where the converted image comprises (i) a surface or background portion, (ii) one or more positioned non-linear boundaries, and (iii) one or more textual objects, where the one or more textual objects are positioned such that each object is at a first distance from the one or more positioned non-linear boundaries. Such a first distance may be an equal distance from one or more positioned non-linear boundaries, of the one or more positioned boundaries, that are located above and below the one or more objects, or the first distance may be an equal distance from a positioned non-linear boundary, of the one or more positioned boundaries, that is located above or below the one or more objects.

Each of the one or more positioned boundaries may be separated by a second distance, and the first distance may be substantially ⅓ of the second distance.

Such an electronic processor may be further operable to execute additional stored instructions to complete one or more of the following functions and/or features: adjusting a slope of the non-linear boundaries; select one or more objects within the non-linear, dyslexic-friendly readable image, present a list of functional or informative indicators, select an indicator from the list, and complete a function or display information associated with selected indicator.

In another embodiment, an electronic processor may complete the functions described and still be further operable to execute stored instructions to present a definition of selected one or more objects.

In yet another embodiment, an electronic processor may be further operable to execute stored instructions to: select one or more objects within the non-linear, dyslexic-friendly readable image; emphasize the one of more selected objects; and/or de-emphasize non-selected objects within the non-linear, dyslexic-friendly readable image.

Other exemplary, inventive electronic processors may complete the functions described above and herein, including, for example: executing stored instructions to: display an edit indicator; select an object from the one or more objects to be edited; edit the object; and/or visually indicate a selected object is being edited by presenting an image editing indicator.

In any of the exemplary electronic devices described above or herein, such a device may include an electronic processor that is further operable to execute stored instructions to re-convert a non-linear, dyslexic-friendly image to linear formatted text.

It should be understood that the one or more objects mentioned above and herein may comprise one or more of grammatical letters, words, numbers, or symbols, where a grammatical letter, word or symbol comprises a character in a language, for example.

Still further, an exemplary electronic device may complete the functions and features described above along with the feature of including a processor that executes stored instructions in order to position one or more of textual objects substantially in a middle of a display.

The inventor believes that the inventive methods and devices will substantially help people with learning differences, such as dyslexics, read, spell, and comprehend information as well as help such individuals perform arithmetic.

BRIEF DESCRIPTION OF THE DRAWINGS

FIGS. 5B to 5D illustrate an exemplary method of converting a linear formatted image into an inventive, non-linear formatted image. FIGS. 5E to 5L depict additional features of an inventive method according to an embodiment of the invention.

FIGS. 6A to 6C depict exemplary examples of the conversion of linear formatted images (e.g., text) into a non-linear formatted, dyslexic-friendly readable image in accordance with embodiments of the invention.

DETAILED DESCRIPTION, WITH EXAMPLES

Figure 1A:
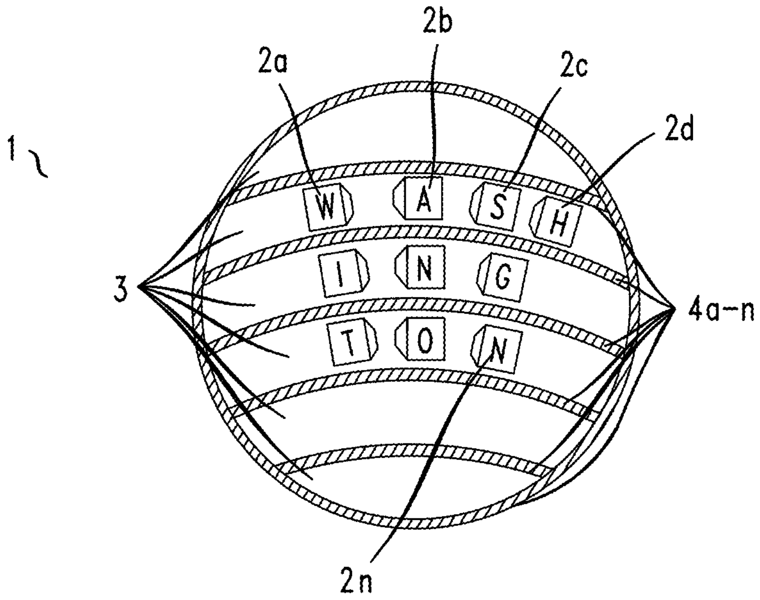
FIGS. 1A to 1C depict, among other things, an exemplary inventive image provided in accordance with an embodiment of the invention.

Exemplary embodiments for providing dyslexic-friendly readable images are described herein and are shown by way of example in the drawings. Throughout the following description and drawings, like reference numbers/characters refer to like elements. It should be understood that although specific embodiments are discussed herein, the scope of the disclosure is not limited to such embodiments. On the contrary, it should be understood that the embodiments discussed herein are for illustrative purposes, and that modified and alternative embodiments that otherwise fall within the scope of the disclosure are contemplated. It should also be noted that one or more exemplary embodiments may be described as a process or method (the words "method" may be used interchangeably with the word "process" herein). Although a process/method may be described as sequential, it should be understood that such a process/method may be performed in parallel, concurrently or simultaneously. In addition, the order of each step within a process/method may be re-arranged. A process/method may be terminated when completed, and may also include additional steps not included in a description of the process/method if, for example, such steps are known by those skilled in the art. It should be understood that when an system or device, or a component or element of a system or device, is referred to, or shown in a figure, as being "connected" to (or other tenses of connected) another system, device (or component or element of a system or device) such systems, devices, components or elements may be directly connected, or may use intervening components or elements to aid a connection. In the latter case, if the intervening systems, devices, components or elements are well known to those in the art they may not be described herein or shown in the accompanying figures for the sake of clarity. It should be understood that, as used herein, the designations "first", "second", "third", "fourth" etc., is purely to distinguish one parameter or element from another and does not indicate a priority or order. The parameters or elements could be re-designated (i.e., re-numbered) and it would not affect the methods or devices provided by the present invention.

As used herein, the term "and/or" includes any and all combinations of one or more of the associated listed items. As used herein, the singular forms "a," "an" and "the" are intended to include the plural form, unless the context and/or common sense indicates otherwise. It should be understood that the terms "comprises", "comprising,", "includes" and/or "including", when used herein, specify the presence of stated features, steps, operations, elements, and/or components, but do not preclude the presence or addition of one or more other features, steps, operations, elements, components, and/or combinations thereof. As used herein the term "operable to" means "functions to" unless the context, common sense or knowledge of one skilled in the art indicates otherwise. More particularly, when used to describe the operation of an electronic processor the phrase "operable to" may mean such a processor and its associated memory execute stored instructions to complete certain functions.

It should be understood that the phrase "processor" means one or more electronic devices (e.g., specialized programmed electronic processors) that is (are) operable to be specially programmed to retrieve and execute specific instructions stored as electronic signals in electronic memory, where a set of such stored specific instructions may constitute steps in an inventive process or method, or may be executed to complete an inventive function(s), such as completing the functions or steps of: selecting, displaying, locating, identifying, presenting, converting, re-converting, positioning, dividing, separating, reading, receiving, inputting, transmitting, reproducing, generating, communicating, creating, highlighting, boldening, emphasizing, re-emphasizing, adjusting, and varying to name just a few of the inventive functions/processes that may be completed by executing such stored electronic instructions. Further, it should be understood that each embodiment of a processor described herein is further configured with the necessary hardware and firmware components to enable each to process stored instructions and complete inventive functions/steps in a process much faster than humanly possible. Each of the electronically-based embodiments of the present invention cannot practically be implemented in any amount of time that would be acceptable to one skilled in the art using human beings as substitutes for the electronic systems, processes and devices described herein. Accordingly, the use of humans as substitutes for such methodologies is contrary to the objectives of the invention and does not result in the improvements provided by the invention.

As used herein "dyslexic-friendly" means an inventive image that can be easily read and understood by individuals who suffer from a learning difference, such as dyslexia.

As used herein the word "text" may refer to a single grammatical letter, word or symbol, a sentence, phrase, and/or a mathematic number, symbol or operator, for example. Together a plurality of text may form a paragraph or mathematical equation, for example. Further, it should be understood that "text" that comprises a grammatical letter, word or symbol may further comprise a character in a language. As used herein the phrases "embodiment" or "exemplary" mean a non-limiting example of the present invention. Though the embodiments described herein and shown in the figures may depict certain geometric shapes, it should be understood that these shapes are merely exemplary, and, accordingly, other shapes may be substituted for the so described and depicted shapes.

Still further, it should be understood that an electronic device that completes features and functions of embodiments of the invention may include stored instructions that form a web browser that is a part of an interface, a stored "plug-in", or one or more applications (often referred to herein as an "APP" or "APPS") that have been installed into, or downloaded onto, an electronic device. An "APP" or plug-in may include "content" (e.g., text, audio and video files), signaling and configuration files. For the sake of convenience and not limitation, the terms "APP" or "application" are used herein to refer to any application, but use of such a term also includes a reference to any file or data. In one embodiment, an APP to be downloaded onto a device may also reside or be stored on one or more hardware devices, such as a server in whole and/or in part, the later indicating that the APP may be distributed among, and by, a number of devices (servers). An APP may be downloaded to a user's device from an APP server (or servers as the case may be) or have been otherwise provided and installed on such a server. A given user's electronic device may have a need for one or more of the APPs installed on a server. Accordingly, it should be understood that each of the embodiments described herein includes protocols, necessary hardware, software and firmware resident on a user device for transmitting and receiving (i.e., transceiving) an APP, content and/or content identification information relating to the APP from/to a server and vice-versa. It should be understood that depending on the content to be transmitted, an APP may be installed directly on a user device or may be downloaded from a server by initiating a request to a server to receive a local copy of the APP. When a discussion herein describes transmissions from a user's electronic device to a server, or vice-versa, it should be understood that a web browser, plug-in and/or APP may be used to complete such transmissions and receptions.

Figure 1B:
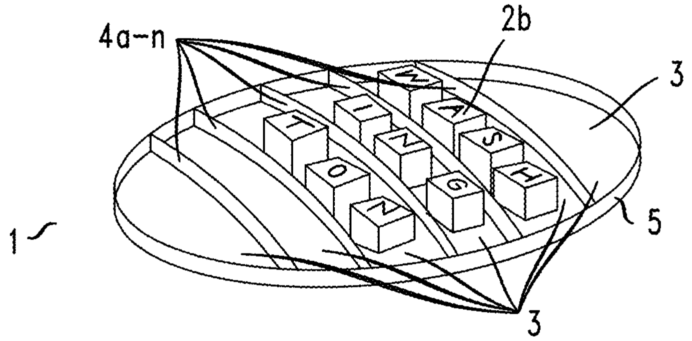
Figure 1C:
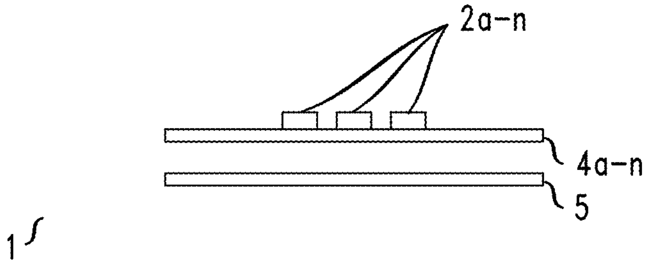

Referring now to FIGS. 1A to 1C there is depicted an exemplary inventive image 1 provided in accordance with an embodiment of the invention. As shown the image 1 may comprise a surface or background portion 3 with one or more positioned non-linear (i.e., curved) boundaries 4*a* to 4*n* (where "n" represents the last boundary) (e.g., non-linear lines) for dividing the image into textual locations and one or more textual objects 2*a*-2*n* (e.g., 3-dimensional text) representing text positioned on the portion such that each object is at a same first distance from the one or more positioned non-linear boundaries 4*a* to 4*n*. As noted previously, the one or more objects 2*a* to 2*n* may comprise one or more grammatical letters, words, numbers, and symbols, for example (i.e., collectively "text"). Still further, in one embodiment, each of the objects 2*a* to 2*n* may comprise text presented in a block-lettering format. In one embodiment the first distance may comprise an equal distance from the one or more positioned non-linear boundaries 4*a* to 4*n*, that are located above and below the one or more objects 2*a* to 2*n*, to the objects 2*a* to 2*n*. Alternatively, first distance may be an equal distance from the non-linear boundaries 4*a* to 4*n* that is located above or below the one or more objects 2*a* to

2*n*, to the objects 2*a* to 2*n*. Accordingly, the objects 2*a* to 2*n* may appear to "follow" the positioned non-linear boundaries 4*a* to 4*n*. Because of the positioning of the textual objects, the image 1 effectively, visually separates text (e.g., a word or phrase and/or elements thereof (e.g., letters) from another word or phrase so that a person with a learning difference, such as a dyslexic, can read and understand the text represented by the image 1. As depicted in FIGS. 1A and 1B the entire image 1 may be formed as a circular or oval image. Accordingly, when the entire image is reproduced it may be reproduced as a circular or oval image. Still further, the image 1 may optionally comprise a 3D border 5 that corresponds to the geometric shape of the image 1, in this case a circular or oval shape. The border 5 may appear as a circumference or edge of the image 1.

Though the objects 2*a* to 2*n* may be a first distance from each of the one or more positioned boundaries 4*a* to 4*n*, the positioned boundaries 4*a* to 4*n* themselves may each be separated or positioned from one another by a second distance. In one embodiment, the first distance may be substantially ⅓ of the second distance. In yet another embodiment, one or more of the one or more positioned boundaries 4*a* to 4*n* may be located above or below each of the one or more objects 2*a* to 2*n* at a third distance from each of the one or more objects 2*a* to 2*n*, while another one of the one or more positioned boundaries is located below or above the one or more objects and is at a fourth distance, where the third and fourth distances may be different from each other and may vary from a second distance by up to 10%. Alternatively, the third and fourth distances may be the same distance. Though the exemplary images shown in the figures depict continuous boundaries it should be understood that the boundaries may comprise one or more undulations.

Figure 5A:
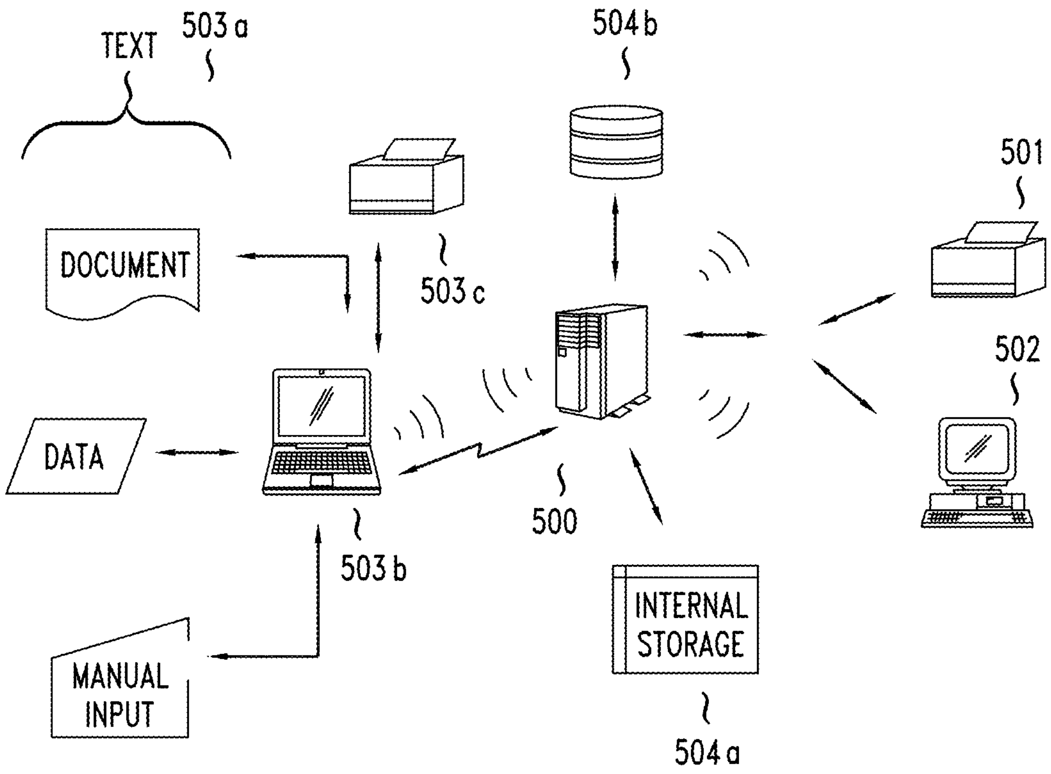
FIG. 5A depicts a simplified block diagram of a technique for providing inventive images that presents or displays text in a non-linear format to substantially improve the ability of person with a learning difference, such as dyslexia, to read and comprehend the so presented/displayed text.

Referring now to FIG. 5A there is depicted a simplified block diagram of a technique for providing inventive, dyslexic-friendly readable images in a non-linear format to substantially improve the ability of a person with a learning difference, such as a dyslexic, to read and comprehend the so provided images. As depicted, the method may include the use of two dimensional, linear text, letter, symbol, word, sentence or phrase (collectively "information"; e.g., see FIG. 6A) that may take the form of, for example, a document 503*a* (e.g., scanned document), stored electronic data 503*a* (e.g., a web site stored in a browser that is then displayed, from an electronic device such as a memory "thumb drive" or hard drive, etc.) in a linear image format that is input into, or processed by, a local electronic device 503*b*. Alternatively, the linear formatted information may be manually input using a keyboard or touchscreen 503*a*, for example that is part of, or attached to, the local device 503*b*. In a first embodiment the local device 503*b* may access an installed APP, plug-in or stored electronic instructions, for example, and if necessary, communicate with a remote server 500 and send the inputted information to the server 500 in electronic form (electronic signals). Upon receiving the inputted information a processor (or processors) within the server 500 may be operable to execute electronic instructions stored as electronic signals in electronic memory (either onboard 504*a* or separate memory 504*b*) for converting the received information from its linear image format to a non-linear image format that includes one or more positioned non-linear boundaries, such as that shown in FIGS. 1A to 1C, 2A to 2C, 3A to 3E. 4A to 4C, 5D to 5G, 5I to 5L, 6B, 6C and 7A to 7I, for example. Such instructions may further comprise instructions on positioning the textual objects from boundaries at a first, third or fourth distances described herein, positioning the boundaries from one another at a second distance described herein, generating the non-linear boundaries themselves, generating 3-D objects, generating 3-D borders, generating a geometric shape of an image, generating one or more of grammatical letters, words, numbers, or symbols, to name some of the types of instructions. In sum, the instructions are functionally executed by the operation of the electronic processor to generate a dyslexic-friendly readable image comprising the surface or background portion, one or more positioned non-linear boundaries, and one or more textual objects, where the one or more textual objects may be positioned on the portion such that each object is at a first distance from the one or more positioned non-linear boundaries, for example.

In this embodiment it is assumed that the linear formatted information originates from another medium, such as a physical book, piece of paper or the local electronic device 503*b* itself where the original information may be received by, copied, transferred, scanned or manually input (collectively "input") into, the local device 503*b* using means known in the art before the information is communicated to the server 500. The local device 503*b* may communicate the information and other necessary signaling via wired or wireless means with the server 500. The server 500 may be a part of the same local or Wi-Fi communications network as the local device 503*b* or may be located in a different communications network or domain.

In another embodiment images that include, among other features, inventive non-linear boundaries (such as those depicted in FIGS. 1A to 1C, 2A to 2C, 3A to 3E, 4A to 4C, 5D to 5G, 5I to 5L, 6B, 6C and 7A to 7I, for example) may be generated by converting linear formatted text into a dyslexic-friendly, readable image using an electronic device 503*b* without the aid of a server 500. In such an embodiment the local electronic device 503*b* may execute stored instructions to electronically read one or more selected portions of the linear formatted text (e.g., from a web site), and electronically convert the selected text into a non-linear, dyslexic-friendly readable image, where the converted image comprises at least a surface or background portion(s), one or more positioned non-linear boundaries, one or more textual objects, where the one or more textual objects are positioned on the portion such that each object is at a first distance (e.g., a same first distance) from the one or more non-linear boundaries. Alternatively, stored image data (from electronic storage 504*a, b* for example) may be used to generate a non-linear, dyslexic-friendly readable image by the processor within the local device 503*b* or by the server 500 based on executing instructions stored as electronic signals in electronic memory. In the latter case, the server 500 may generate the inventive images without the need to receive signals representing linear formatted information or images from the local device 503*b* or convert such linear information or images, for example. Such instructions may be functionally executed by the server to generate dyslexic-friendly, readable images comprising surface or background portion(s), one or more positioned non-linear boundaries, one or more textual objects, where the one or more textual objects are positioned on the portion such that each object is at a first distance (e.g., a same first distance) from the one or more non-linear boundaries.

As described above, rather than send signals representing linear formatted information to the server 500, the local device 503*b* may comprise means for creating a dyslexic-friendly readable image. For example, in a scenario where the original linear formatted information is not already in an electronic form (e.g., it needs to be scanned or manually input using a keyboard, for example) such means may comprise an electronic receiver that is operable to receive linear formatted information, and an electronic processor operable to execute stored instructions (either onboard or separate memory; not shown in FIG. 5A; e.g., an APP, or plug-in for example) to convert the received, linear formatted information into one or more dyslexic-friendly readable images comprising a surface or background portion, one or more positioned non-linear boundaries, one or more textual objects, where the one or more textual objects are positioned on the portion such that each object is at a first distance (e.g., a same first distance) from the one or more positioned non-linear boundaries. In such an embodiment the device 503*b* may further comprise an electronic storage device operable to store the received, linear formatted information and/or the images. As noted, each of the so converted non-linear images may include one or more positioned non-linear boundaries such as that shown in FIGS. 1A to 1C, 2A to 2C, 3A to 3E, 4A to 4C, 5D to 5G, 5I to 5L, 6B, 6C and 7A to 7I for example. Alternatively, an exemplary means for creating a dyslexic-friendly readable image may comprise, for example, an electronic storage device (e.g., electronic memory) operable to store image data, and an electronic processor operable to generate dyslexic-friendly readable images from the stored image data based on executing stored instructions (e.g., an APP, or plug-in for example).

In each of the embodiments described herein such instructions may comprise instructions on positioning the textual objects from boundaries at a first, third or fourth distances described herein, positioning the boundaries from one another at a second distance described herein, generating the non-linear boundaries themselves, generating 3-D objects, generating 3-D borders, generating a geometric shape of an image, generating one or more of grammatical letters, words, numbers, or symbols, to name some of the types of instructions.

In each of the embodiments described herein the mathematical slope ("slope") of a non-linear boundary may be varied. For example, when inventive non-linear images are displayed by an electronic device a so-displayed image may include a non-linear boundary having a slope between points along the boundary that is greater than one, (e.g., steep slope) or less than one, provided of course the slope between each point cannot be zero. That said, there may be one point in the substantially center of a non-linear boundary (e.g., at the bend of a curved line) that corresponds to a plane whose slope may be zero. In embodiments of the invention, a user of an electronic device may be presented with indicators that allows a user to vary the slope of the non-linear boundaries, for example. In such an embodiment a processor may execute instructions stored in memory to adjust the slope of a non-linear boundary or boundaries of an inventive image.

Yet further the means for creating a dyslexic-friendly, readable image may comprise a physical device or medium (a device that is primarily mechanical or electro-mechanical, as opposed to electronic) comprised of one or more components as described elsewhere herein.

Continuing, once an inventive non-linear image has been generated based on stored image data or by an inventive conversion process an inventive processor in either the local device 503*b* or server 500 may be further operable to execute additional, stored instructions to forward or send the so generated image to a printer 501, local printer 503*b*, separate electronic display 502 or to a display that is part of the local device 503*b* so that the converted image may be thereafter reproduced for viewing by a person with a learning difference, such as a dyslexic. It should be understood that the electronic display 502 may be part of a larger device or system such as an electronic white board, laptop, desktop, smartphone, personal digital assistant, mobile communication terminal, media player, navigational device, electronic book, electronic notepad and other electronic devices offering access to information. Similarly, the local device 503*b* may also comprise an electronic display, electronic whiteboard, laptop, desktop, smartphone, personal digital assistant, mobile communication terminal, media player, navigational device, electronic book, electronic notepad and other electronic devices offering access to information.

Referring now to FIG. 5B there is depicted the display of two dimensional, linear formatted text 505 from an article in a well-known online publication 506 on an electronic device, such as device 503*b*, for example, or one of the other electronic devices mentioned elsewhere herein. As depicted in FIG. 5C, in an embodiment, linear formatted text 505*a* that is to be converted into an inventive non-linear, formatted image may be first selected using one or more methods, such as electronically highlighting the text to be converted on the display of the electronic device. While all of the text 505 in FIG. 5B has been selected for conversion as shown in FIG. 5C, it should be understood that this is merely exemplary. Alternatively, only a portion of the text 505 may be selected for conversion into an inventive non-linear, formatted image. In an embodiment, a processor or processors within the electronic device that is displaying the selected text 505*a* may be operable to execute instructions stored in one or more memories for reading the selected text 505*a* and then converting the selected text 505*a* into an inventive, non-linear formatted image or images. In an embodiment, the stored instructions may take the form of a so-called software "plug-in". In addition, the instructions may be a part of an APP and/or some instructions may be executed by a server, such as server 500 that is communicating with the electronic device.

Figure 5D:
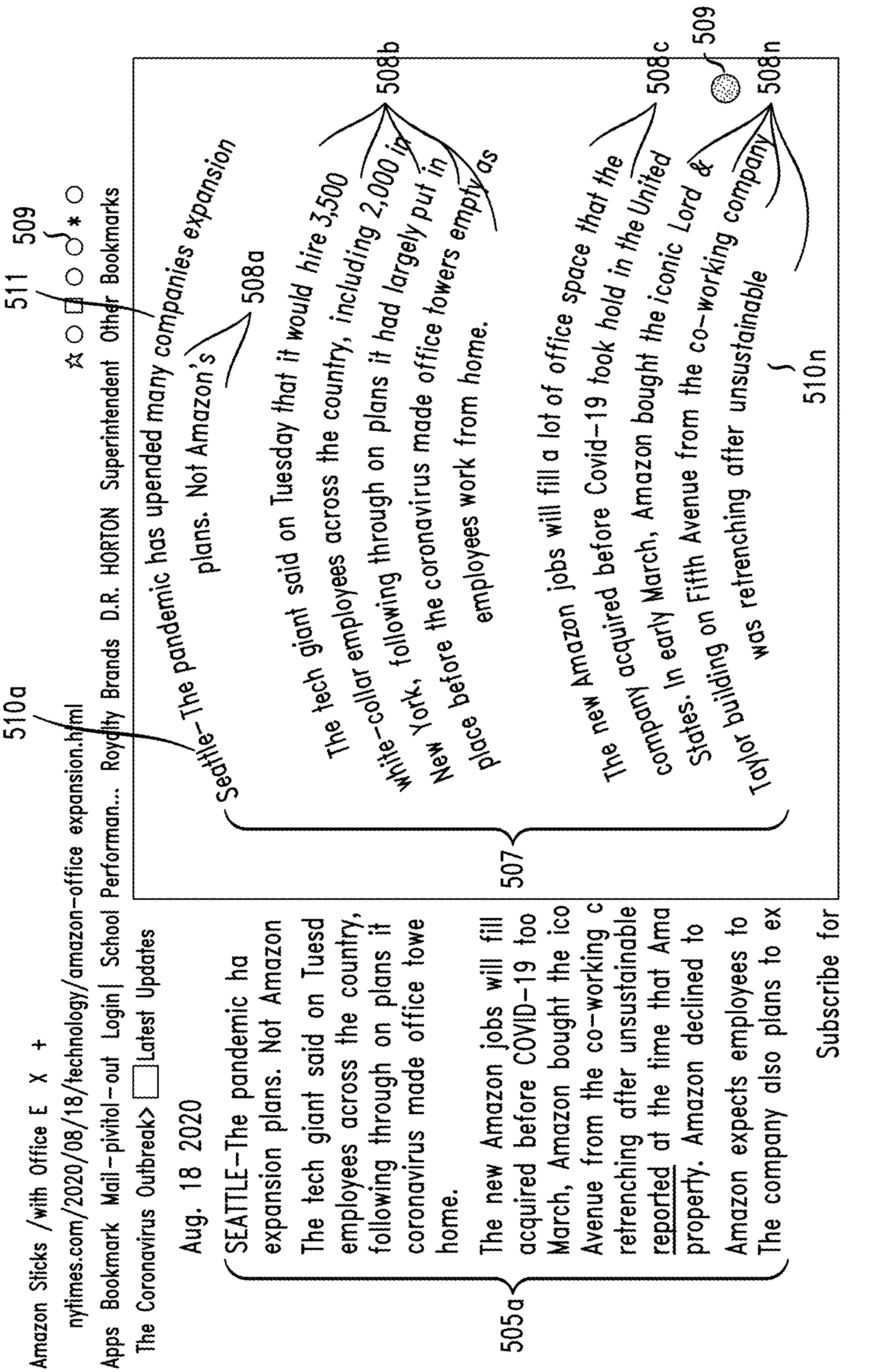
Figure 5I:
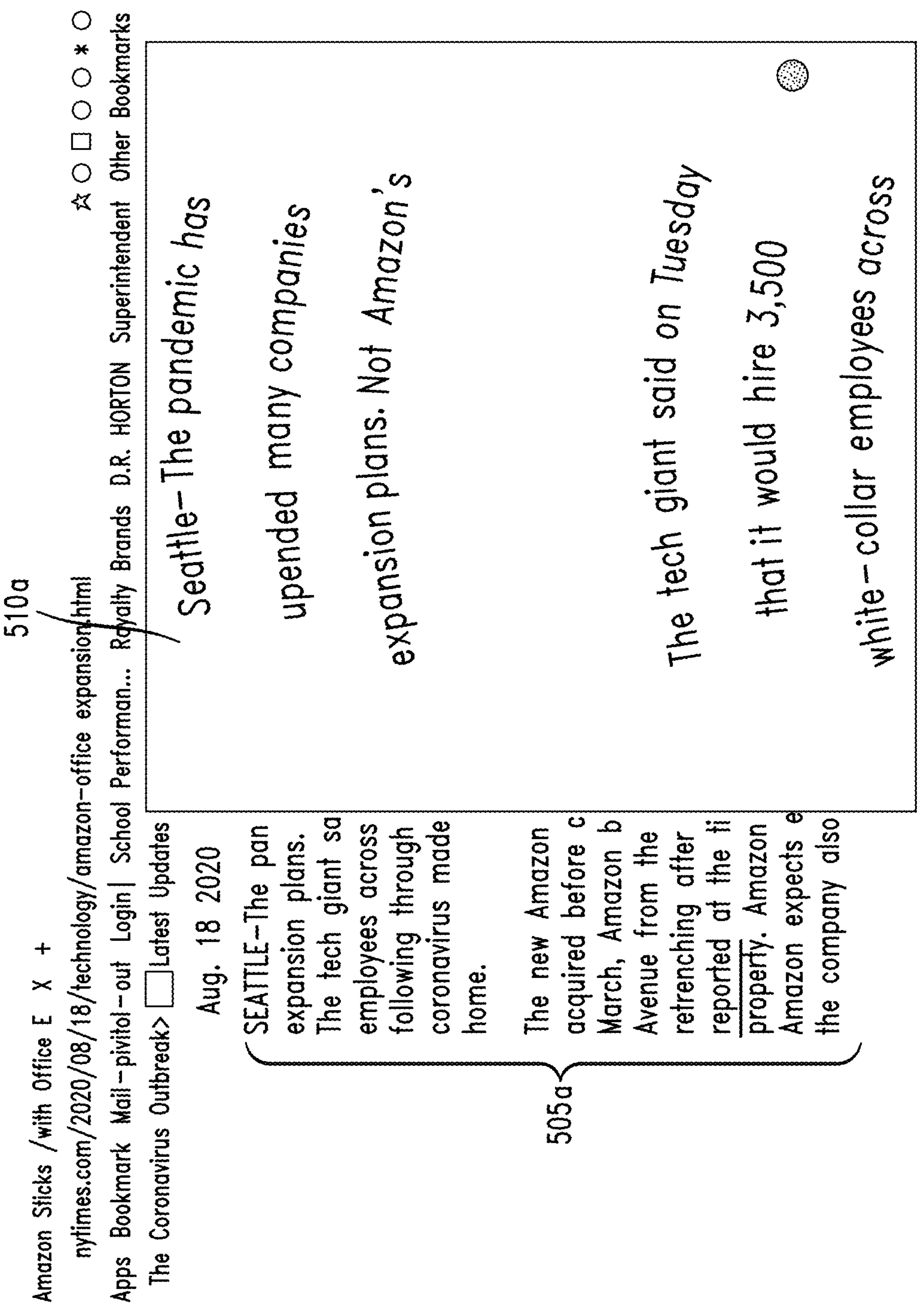

Referring now to FIG. 5D there is depicted an exemplary, non-linear formatted image 507 comprising at least one or more positioned non-linear boundaries 508*a* to *n* (where "n" again denotes the last boundary), one or more objects 510*a* to *n* (where "n" again denotes the last object) and a background portion 511 that have been converted from the selected text 505*a* using stored instructions. Optionally, one or more separate indicators 509 (e.g., icons, symbols) which indicate that a conversion has occurred may be displayed or otherwise indicated to a user of the electronic device that is displaying the image 507.

Further, stored instructions may also comprise instructions on positioning the textual objects 510*a* to *n*, from boundaries 508*a* to *n* at a first, third or fourth distances described herein, positioning the boundaries 508*a* to *n* from one another at a second distance described herein, generating the non-linear boundaries themselves 508*a* to *n*, generating 3-D objects, generating 3-D borders, generating a geometric shape of an image 507, generating one or more of grammatical letters, words, numbers, or symbols, to name some of the types of instructions. In sum, the instructions are functionally executed by the operation of the electronic processor to generate the dyslexic-friendly, readable image 507 comprising the surface or background portion 511, the one or more positioned non-linear boundaries 508*a* to *n*, the one or more textual objects 510*a* to *n*, where the one or more textual objects 510*a* to *n* are positioned on the portion 511 such that each object 510*a* to *n* is at a first distance (e.g., a same first distance) from the one or more positioned non-linear boundaries 508*a* to *n*, for example.

FIGS. 5E to 5G depict additional features of an inventive method according to an embodiment of the invention. As shown one or more objects 510*a* to *n*, such as exemplary object 510*x*, may be electronically selected within the image 507 for further processing by a processor within the electronic device operable to execute instructions stored in one or more memories. In the example illustrated in FIGS. 5E to 5G after the object 510*x* is selected the processor executes instructions to display or otherwise present to a user a list 512 of functional or informative indicators 513*a* to *n*. The list 512 may take the form of a drop-down menu, for example. Thereafter, the user may electronically select an indicator 513*a* to *n* from the list 512. Upon selection of an indicator 513*a* to *n* the processor may execute stored instructions to complete the function or display the information associated with selected indicator 513*a* to *n*. In the embodiments depicted in FIGS. 5E to 5G, the function associated with the indicator 513*a* may comprise a "definition" function. Thus, in an embodiment, a definition 514 for the word "employees" 510*x* (or one of its tenses, e.g., "employee" 5100*x*) that comprises the object 510*x* may be searched for, located, displayed or otherwise presented (collectively "presented") to the user (see FIG. 5G). It should be understood that definitions may be stored in memory within an electronic device or, perhaps more typically, may be stored by one or more online servers associated with a web site that the device (e.g., its processor) communicates with to electronically locate and retrieve for display to a user.

Referring back to FIG. 5E, as illustrated one or more objects 510*a* to *n* may be selected, in this case highlighted. In an alternative embodiment one or more (e.g., a plurality) of objects 510*a* to *n* along a non-linear boundary 508*a* to *n* may be selected and boldened for emphasis (collectively "emphasized") while, at the same time, objects 510*a* to *n* that are not selected ("non-selected object") are not emphasized. For example, a user may select one set of objects 510*a* to *n* associated with one boundary 508*a* to *n* for emphasis while de-emphasizing the non-selected objects 510*a-n* by, for example, boldening the emphasized set for display, and/or, faintly displaying the de-emphasized objects. This emphasis/de-emphasis may be repeated for objects 510*a-n* along a plurality of adjacent or non-adjacent boundaries 508*a-n*. It should be understood that the selection of text to be emphasized/de-emphasized may occur prior to conversion of the linear formatted text 505 into a non-linear, dyslexic-friendly image. In such a scenario the text to be emphasize and/or de-emphasized is selected and upon conversion the selected text is either displayed or otherwise presented to the user (e.g., printed out) as an emphasized or de-emphasized portion of a non-linear, dyslexic-friendly image. Further, a user may choose to select and emphasize only a portion of objects that make up a set that are associated with the same boundary (e.g., some words along the same boundary are emphasized, while some are not).

Figure 5K:
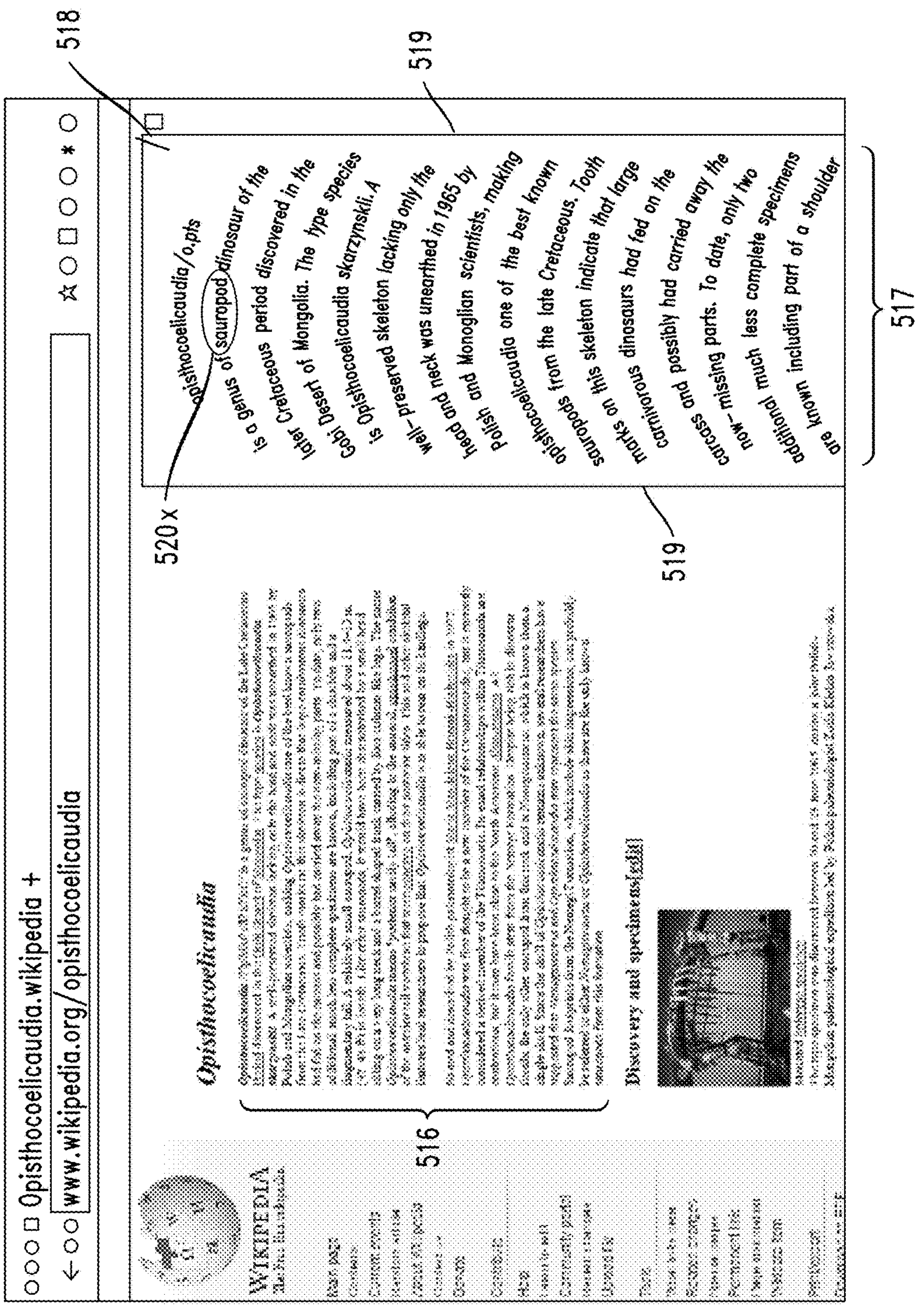

Referring now to FIGS. 5J to 5L there is depicted still more features of an inventive method according to another embodiment of the invention. As shown in FIG. 5J, an exemplary, non-linear formatted image 517 comprising at least one or more positioned non-linear boundaries 521*a-n* (where "n" again denotes the last boundary), one or more textual objects 520*a* to *n* (where "n" again denotes the last object) and a background portion (not labeled for the sake of clarity) that have been converted from the selected text 516 using stored instructions by a processor within the electronic device operable to execute instructions stored in one or more memories. Also shown is an "edit indicator" 518 that may be generated and so displayed by executing stored electronic instructions as well.

Referring now to FIG. 5K, in an embodiment a user may select (e.g., highlight) an object 520*x* to be edited (e.g., correct the spelling of the object, insert an object by typing the object in, delete the object, copy an object, or paste in another object if a "spatial" object (a space) is selected, etc.,) using a cursor 522. Thereafter, the user may edit the object 520*x* by, for example, selecting the indicator 518 (e.g., move a cursor over, and click on, the indicator; an exemplary cursor 522 is shown in FIG. 5L) in order to initiate a process whereby the electronic processor completes the function of editing. To visually indicate to the user that objects within the image 517 are being edited, a border 519 or other image editing indicator may be displayed to the user. The indicator 519 may surround all, or part, of the inventive image, for example.

Once an object in an inventive, non-linear, dyslexic-friendly image has been edited, the inventive, edited image may then be displayed, or sent to a printer, for example. Alternatively, the inventive, edited image may be re-converted back it to its original, linear format text or image.

In each of the embodiments depicted in FIGS. 5J to 5L (as well as the other figures that depict an inventive, non-linear dyslexic-friendly image) the objects may be configured such that the objects are aligned along, adjacent or associated with a non-linear boundary such that a first and last object in a group of objects (e.g., the first and last words in a sentence) aligned along, adjacent or associated with the same boundary are spaced a distance from a margin or border (the latter in the case where the editing feature has been selected and displayed). In an embodiment a group of objects (e.g., sentence) may be displayed such that one group of objects appears to "wrap" around to another group of objects (e.g., to the next sentence).

In another embodiment, rather than generate the image using an electronic device, such as local device 503*b* or server 500, the image may be generated by constructing components of a physical device or medium (a device that is primarily mechanical or electro-mechanical, as opposed to electronic), where each component represents an element of a dyslexic-friendly readable, non-linear image.

For example, referring back to FIGS. 1A to 1C, the components of such a physical device or medium may comprise a background portion 3, positioned non-linear boundaries (i.e., curved) lines 4*a* to *n* (where "n" represents the last boundary) that divides the eventual image into locations, and one or more textual objects 2*a*-2*n* representing the text. It should be understood that one or more of the components need not be flat. For example, each of the boundaries 4*a* to *n* and/or textual objects 2*a* to 2*n* may be represented as, or correspond to, a raised 3D component (e.g., for a textual object, a physical rectangular block of wood, for example) with a letter or other symbol, for example, applied to it giving the corresponding component a 3D appearance.

The composition of each of the components and the device or medium itself may comprise a type of wood, metal, vinyl or plastic, or some combination of such materials, for example. Alternatively one or more of the elements of the image 1 may be represented by a paint or similar material applied to the surface of the device or medium (e.g., for the non-linear boundaries). Regardless of the device or medium's or component's composition, in an embodiment the components corresponding to textual objects may be positioned as described previously—at a first, third or fourth distance from components corresponding to boundaries above and/or below the objects and following a positioned boundary above and/or below the object. The resulting physical device or medium may effectively, visually separate components corresponding to a word or phrase and/or elements thereof (e.g., letters) in text from another component corresponding to a word or phrase using the boundaries so that a person with a learning difference, such as a dyslexic, can read and understand the text that is represented by the components.

The component corresponding to the background portion 3 or another supporting portion of the physical device or medium may have a circumference, perimeter or edge shaped as a circle or oval to correspond to the shape of the entire image 1.

When the image 1 is created using such a physical device or medium it may be necessary to apply one or more elements or parts of the image 1 to individual components of the physical device or medium. For example, each of the textual objects (e.g., letters) may be individually applied/labeled to a physical component of the physical device (e.g., a letter is applied to a 3D block of wood). Thereafter, the so labeled component with its corresponding textual object may be inserted onto the surface of the physical device and positioned along a component corresponding to one of the positioned non-linear (i.e., curved) boundaries (similar to boundaries 4*a* to *n*) that have also been formed and positioned on the surface of the physical device or as a raised component so that each component corresponding to an object is at a first, third or fourth distance from components corresponding to boundaries above and/or below the objects and following a positioned boundary above and/or below the object as noted previously. The positioning of the components corresponding to textual objects from a boundary or boundaries and the positioning of the boundaries themselves effectively, visually separates a word or phrase and/or elements so represented (e.g., letters) from another word or phrase so that a person with a learning difference, such as a dyslexic, can read and understand the represented components.

As shown image 1 includes textual objects 2*a*-2*n* representing the word "Washington" as an example. The word "Washington" may be separated and then presented in a non-linear format so that the image 1 can be readily read and understood by a person with a learning difference, such as a dyslexic. While a single word is represented by the objects 2*a* to 2*n* in FIGS. 1A to 1C, it should be understood that this is merely exemplary and more than one word may be represented by one or more of the objects 2*a* to 2*n*. Conversely, a word with fewer letters (e.g., as few as one letter) or letters that do not comprise a word (e.g., the alphabet) may represented by one or more of the objects 2*a* to 2*n*. The inventor believes that presenting a word or words using the non-linear boundaries depicted in FIGS. 1A to 1C substantially improves the ability of a person with a learning difference, such as a dyslexic, to read and comprehend sentences represented by the image 1.

Figure 2A:
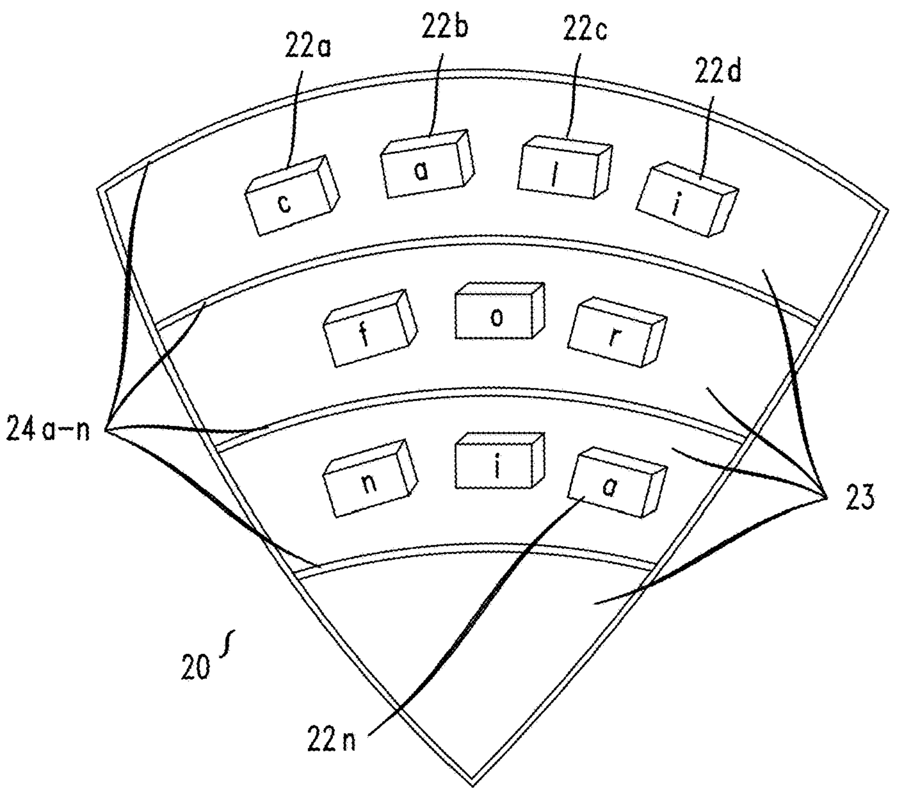
FIGS. 2A to 2C depict, among other things, another exemplary inventive image provided in accordance with an embodiment of the invention.
Figure 2B:
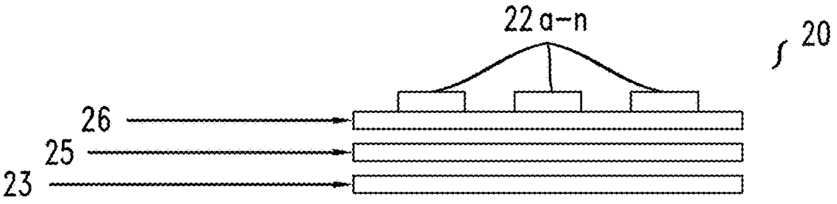
Figure 2C:
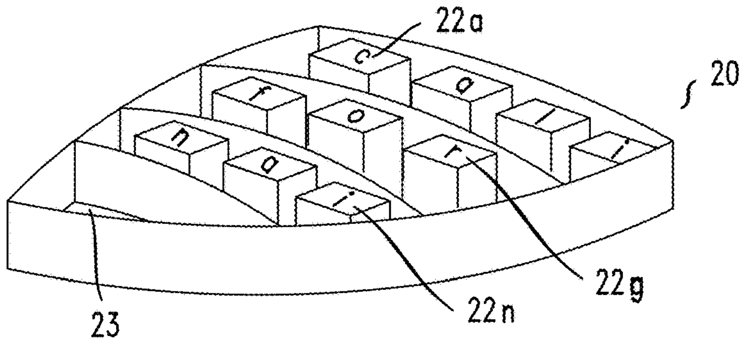

Referring now to FIGS. 2A to 2C there is depicted another exemplary inventive dyslexic-friendly readable image 20 generated in accordance with an embodiment of the invention. As shown the image 20 may comprise a surface or background portion 23 with positioned non-linear (i.e., curved) boundaries 24*a* to 24*n* (where "n" represents the last boundary) for dividing the image into locations and one or more textual objects 22*a*-22*n* representing text positioned on the portion such that each object is at a first distance (e.g., a sane first distance) from the one or more positioned non-linear boundaries 24*a* to 24*n*. As noted previously, the one or more objects 22*a* to 22*n* may comprise one or more grammatical letters, words, numbers, and symbols, for example (i.e., "text"). Still further, in one embodiment, each of the objects 22*a* to 22*n* may comprise text presented in a block-lettering format.

In one embodiment the first distance may comprises an equal distance from the one or more positioned non-linear boundaries 24*a* to 24*n*, that are located above and below the one or more objects 22*a* to 22*n*, to the objects 22*a* to 22*n*. Alternatively, first distance may be an equal distance from the positioned non-linear boundaries 24*a* to 24*n* that is located above or below the one or more objects 22*a* to 22*n*, to the objects 22*a* to 22*n*. Accordingly, the objects 22*a* to 22*n* may appear to "follow" the positioned non-linear boundaries 24*a* to 24*n*. Because of the positioning of the textual objects, and the positioning of the boundaries the image 20 effectively, visually separates text (e.g., a word or phrase and/or elements thereof (e.g., letters) from another word or phrase) so that a person with a learning difference, such as a dyslexic, can read and understand the text represented by the image 20. As depicted in FIGS. 2A and 2C the entire image 20 may be formed as a shield-like image. As depicted in FIGS. 2A and 2C the entire image 20 may be formed as an inverted Reuleaux triangle or shield-shaped image. Accordingly, when the entire image is reproduced it may be reproduced as an inverted Reuleaux triangle or shield-shaped image. Still further, the image 20 may optionally comprise a 3D border 26. The border may appear on top of edge of the image 20. Yet further the image may include an optional colored film 25 between the triangle/shield and the border structure, if desired, for additional contrast.

Though the objects 22*a* to 22*n* may be a first distance from each of the one or more positioned boundaries 24*a* to 24*n*, the boundaries 24*a* to 24*n* themselves may each be separated or positioned from one another by a second distance. In one embodiment, the first distance may be substantially ⅓ of the second distance. In yet another embodiment, one or more of the one or more positioned boundaries 24*a* to 24*n* may be located above or below each of the one or more objects 22*a* to 22*n* at a third distance from each of the one or more objects 22*a* to 22*n*, while another one of the one or more positioned boundaries may be located below or above the one or more objects and is at a fourth distance, where the third and fourth distances may be different from each other and may vary from a second distance by up to 10%. Alternatively, the third and fourth distances may be the same distance. Though the exemplary images shown in the figures depict continuous positioned boundaries it should be understood that the boundaries may comprise one or more undulations.

The image 20 may be initially generated using similar methods described herein using, for example, the processor in server 500, the various means for creating a dyslexic-friendly, readable image in local device 503*b* described herein (including using the types of electronically stored instructions described herein) or by creating a physical device or medium with the understanding that the means for creating a dyslexic-friendly image may comprise one or more processors operable to execute instructions stored as electronic signals in electronic memory (either onboard or separate memory) for converting text from a linear image format to an non-linear, dyslexic-friendly readable image 20 that includes one or more positioned non-linear boundaries formed as inverted Reuleaux triangle or shield shape 20, or alternatively, generating the image 20 formed as an inverted Reuleaux triangle or shield shape based on images (image data) stored in memory 504*a*, 504*b*, for example.

Further, once the inventive image 20 has been generated a processor in either the local device 503*b* or server 500 may be further operable to execute additional, stored instructions to control the forwarding or sending of the so generated image to a printer 501, local printer 503*b*, separate display 502 or to a display that is part of the local device 503*b* so that the converted image may be thereafter reproduced for viewing by a person with a learning difference, such as a dyslexic.

As with the images in FIGS. 1A to 1C, the image 20 may be generated by constructing components of a physical device or medium (a device that is primarily mechanical or electro-mechanical, as opposed to electronic), where each component represents an element of the image. For example, the components of such a physical device or medium may comprise components corresponding to background portion 23, positioned non-linear (i.e., curved) boundaries 24*a* to 24*n* (where "n" represents the last boundary) that divides the eventual image into locations, and one or more textual objects 22*a*-22*n* representing text. It should be understood that one or more of the components need not be flat. For example, each of the positioned boundaries 24*a* to 24*n* or textual objects 22*a* to 22*n* may comprise a raised 3D component (e.g., for a textual object, a physical rectangular block of wood, for example) with a letter or other symbol, for example, applied to it giving the component a 3D appearance.

The composition of each of the components and the device or medium itself may again comprise a type of wood, metal, vinyl or plastic, or some combination of such materials, for example. Alternatively one or more of the elements of the image 20 may be a paint or similar material applied to the surface of the device or medium (e.g., for the non-linear boundaries). Regardless of the device or medium's or component's composition, in an embodiment the components corresponding to textual objects 22*a* to 22*n* may be positioned as described previously—at a first, third or fourth distance from components corresponding to positioned boundaries above and/or below the objects and following a boundary above and/or below the object. The resulting physical device or medium may effectively, visually separate components corresponding to a word or phrase and/or elements thereof (e.g., letters) in text from another component corresponding to a word or phrase using the positioned boundaries so that a person with a learning difference, such as a dyslexic, can read and understand the text that is represented by the components.

The component corresponding to the background section 23 or another supporting section of the physical device or medium may have a perimeter or edge shaped as an inverted Reuleaux triangle or shield to correspond to the shape of the image 20.

When the image 20 is created using such a physical device or medium it may be necessary to apply one or more elements or parts of the image 20 to individual components of the physical device. For example, each of the textual objects (e.g., letters) 22*a* to 22*n* may be individually applied/labeled to a physical component of the physical device or medium (e.g., a letter is applied to a 3D block of wood). Thereafter, the so labeled component with its corresponding textual object may be inserted onto the surface of the physical device and positioned along one of the positioned non-linear (i.e., curved) boundaries (similar to lines 24*a* to 24*n*) that have also been positioned or formed on the surface of the physical device or as a raised component so that each component corresponding to an object is at a first, third or fourth distance from components corresponding to positioned boundaries above and/or below the objects and following a boundary above and/or below the object as noted previously. The positioning of the components corresponding to textual objects 22*a* to 22*n* from, and/or along, a boundary or boundaries and the positioning of the boundaries themselves effectively, visually separates a word or phrase and/or elements so represented (e.g., letters) in text from another word or phrase so that a person with a learning difference, such as a dyslexic, can read and understand the text based on the components.

Referring again to FIGS. 2A to 2C, as shown image 20 includes textual objects 24*a*-24*n* representing the word "California" as an example. As shown, the word "California" is separated and presented in a non-linear format that can be readily read and understood by a person with a learning difference, such as a dyslexic. While a single word is represented by the objects 24*a* to 24*n*, it should be understood that this is merely exemplary and more than one word may be represented by the objects 24*a* to 24*n*. Conversely, a word with fewer letters (e.g., as few as one letter) or letters that do not comprise a word (e.g., the alphabet) may represented by the objects 24*a* to 24*n*. The inventor believes that presenting a word or words from, and/or along a positioned boundary or boundaries depicted in FIGS. 2A to 2C substantially improves the ability of a person with a learning difference, such as a dyslexic, to read and comprehend individual words.

Referring now to FIGS. 3A to 3F there are depicted additional exemplary inventive images 300,301 generated in accordance with an embodiment of the invention. As shown images 300,301 may comprise a surface or background portion 330,331 respectively with positioned non-linear (i.e., curved) boundaries 340*a*-340*n*, 341*a*-341*n*, respectively, for dividing the image into locations and one or more textual objects 320*a*-320*n*, 321*a*-321*n* (e.g., see FIG. 3E), respectively, positioned on the portion such that each object is at a same first distance from the one or more positioned non-linear boundaries 340*a*-340*n*, 341*a*-341*n*. As noted previously, the one or more objects 320*a*-320*n*, 321*a*-321*n* may comprise one or more grammatical letters, words, numbers, and symbols, for example (i.e., "text"). Still further, in one embodiment, each of the objects 320*a*-320*n*, 321*a*-321*n* may comprise text presented in a block-lettering format.

In one embodiment the first distance may comprise an equal distance from the one or more positioned non-linear boundaries 340*a*-340*n*, 341*a*-341*n*, that are located above and below the one or more objects 320*a*-320*n*, 321*a*-321*n*, to the objects 320*a*-320*n*, 321*a*-321*n*. Alternatively, first distance may be an equal distance from the positioned non-linear boundaries 340*a*-340*n*, 341*a*-341*n*, that is located above or below the one or more objects 320*a*-320*n*, 321*a*-321*n*, to the objects 320*a*-320*n*, 321*a*-321*n*. Accordingly, the objects 320*a*-320*n*, 321*a*-321*n* may appear to "follow" the positioned non-linear boundaries 340*a*-340*n*, 341*a*-341*n*. Because of the positioning of the textual objects and the boundaries the images 300,301 effectively, visually separates text (e.g., a word or phrase and/or elements thereof (e.g., letters) from another word or phrase) so that a person with a learning difference, such as a dyslexic, can read and understand the text represented by the images 300,301.

Though the objects 320*a*-320*n*, 321*a*-321*n* may be a first distance from each of the one or more positioned boundaries 340*a*-340*n*, 341*a*-341*n*, the boundaries 340*a*-340*n*, 341*a*-341*n* themselves may each be separated or positioned from one another by a second distance. In one embodiment, the first distance may be substantially ⅓ of the second distance. In yet another embodiment, one or more of the one or more positioned boundaries 340*a*-340*n*, 341*a*-341*n* may be located or positioned above or below each of the one or more objects 320*a*-320*n*, 321*a*-321*n* at a third distance from each of the one or more objects 320*a*-320*n*, 321*a*-321*n*, while another one of the one or more boundaries may be located or positioned below or above the one or more objects and is at a fourth distance, where the third and fourth distances may be different from each other and may vary from a second distance by up to 10%. Alternatively, the third and fourth distances may be the same distance. Though the exemplary images shown in the figures depict continuous positioned boundaries it should be understood that the boundaries may comprise one or more undulations.

As depicted in FIGS. 3A to 3E an entire image 300,301 may be formed as a circle/oval 300 or rectangle 301. Accordingly, when the entire image 300,301 is reproduced it may be reproduced as a circle/oval or as a rectangular.

The images 300,301 may be generated using similar methods using the processor in server 500, the various means for creating a dyslexic-friendly readable image in local device 503*b* described herein (including using the types of electronically stored instructions described herein), or by creating a physical device or medium with the understanding that the means for creating a dyslexic-friendly image may comprise one or more processors operable to execute instructions stored as electronic signals in electronic memory (either onboard or separate memory) for converting text from a linear image format to an non-linear, dyslexic-friendly readable image 300, 301 that includes one or more positioned non-linear boundaries formed as circular, oval or rectangular shapes, or alternatively, generating the images 300.301 formed as circular, oval or rectangular shapes based on images (image data) stored in memory 504*a*, 504*b*, for example.

Further, once the inventive images 300,301 have been generated a processor in either the local device 503*b* or server 500 may be further operable to execute additional, stored instructions to control the forwarding or sending of the so generated image to a printer 501, local printer 503*b*, separate display 502 or to a display that is part of the local device 503*b* so that the converted image may be thereafter reproduced for viewing by a person with a learning difference, such as a dyslexic.

As with the images in FIGS. 1A to 1C and 2A to 2C, the images 300, 301 may be generated by constructing components of a physical device or medium (a device that is primarily mechanical or electro-mechanical, as opposed to electronic), where each component represents an element of the image 300 or 301. For example, the components of such a physical device or medium may comprise components corresponding to a background portion 330 or 331, positioned non-linear (i.e., curved) boundaries 340*a* to 340*n* or 341*a* to 341*n* that divides the eventual image into locations, and one or more textual objects 320*a*-320*n* or 321*a* to 321*n* representing the text. It should be understood that one or more of the components need not be flat. For example, each of the boundaries 340*a* to 340*n* or 341*a* to 341*n* or textual objects 320*a* to 320*n* or 321*a* to 321*n* may comprise a raised 3D component (e.g., for a textual object, a physical rectangular block of wood, for example) with a letter or other symbol, for example, applied to it giving the component a 3D appearance.

The composition of each of the components and the device or medium itself may again be a type of wood, metal, vinyl or plastic, or some combination of such materials, for example. Alternatively one or more of the elements or parts of an image may be a paint or similar material applied to the surface of the device or medium (e.g., for the non-linear lines). Regardless of the device's or medium's or component's composition, in an embodiment the components corresponding to textual objects 320*a* to 320*n* or 321*a* to 321*n* n may be positioned as described previously—at a first, third or fourth distance from components corresponding to positioned boundaries above and/or below the objects and following a positioned boundary above and/or below the object. The one or more positioned, non-linear curved boundaries of images 300 or 301 represented by the components of the physical device or medium may effectively, visually separate a word or phrase and/or elements thereof (e.g., letters) in text from another word or phrase so that a person with a learning difference, such as a dyslexic, can read and understand the text represented by components of image 300 or 301.

The component corresponding to the background section 330 or 331 or another supporting section of the physical device or medium may have a perimeter or edge shaped as a circle/oval or rectangle to correspond to the shape of the image 300 or 301.

When an image 300 or 301 is created using such a physical device or medium it may be necessary to apply one or more elements or parts of an image 300 or 301 to individual components of the physical device or medium. For example, each of the textual objects (e.g., letters, words, sentences) 320*a* to 320*n* or 321*a* to 321*n* may be individually applied/labeled to a physical component of the physical medium or device (e.g., a letter or word is applied to a 3D block of wood, see FIG. 3E). Thereafter, the so labeled component with its corresponding textual object may be inserted onto the surface of the physical device or medium and positioned along one of the positioned non-linear (i.e., curved) boundaries (similar to boundaries 340*a* to 340*n* or 341*a* to 341*n*) that have also been formed or positioned on the surface of the physical device or medium (e.g., painted on) or as a raised component so that each component corresponding to an object is at a first, third or fourth distance from components corresponding to boundaries above and/or below the objects and following a boundary above and/or below the object as noted previously. The positioning of the components corresponding to textual objects 320*a* to 320*n* or 321*a* to 321*n* from, and/or along a boundary or boundaries and the positioning of the boundaries themselves effectively, visually separates a word or phrase and/or elements so represented (e.g., letters) in text from another word or phrase so that a person with a learning difference, such as a dyslexic, can read and understand the text represented by the components.

Figure 3B:
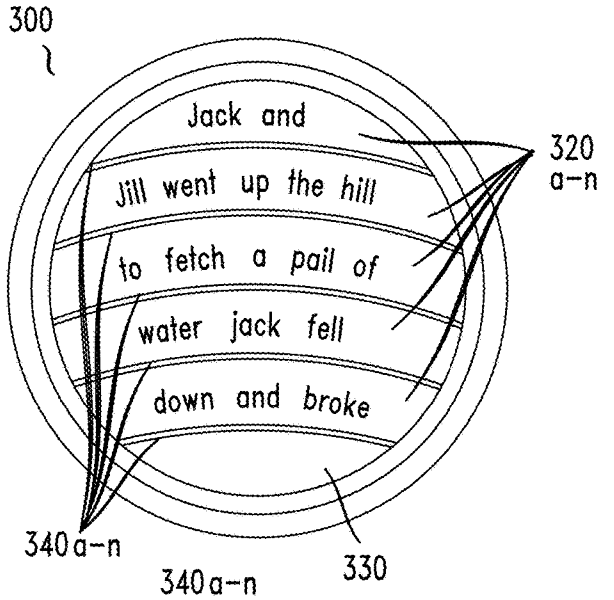
FIGS. 3A to 3F depict, among other things, additional, exemplary inventive images provided in accordance with embodiments of the invention.
Figure 3A:
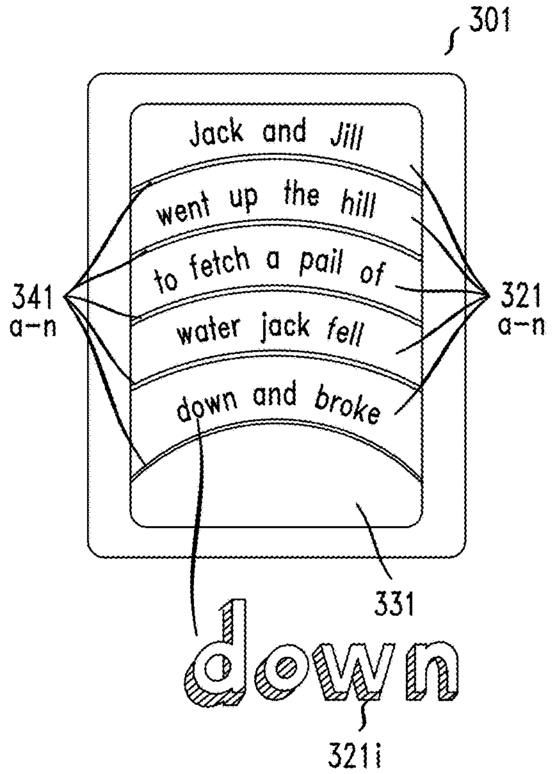
Figure 3C:
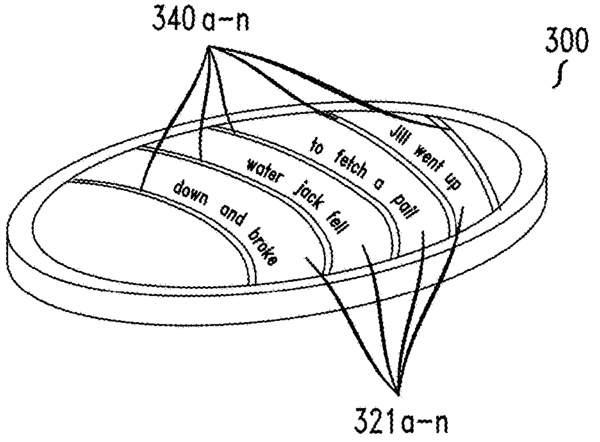
Figure 3D:
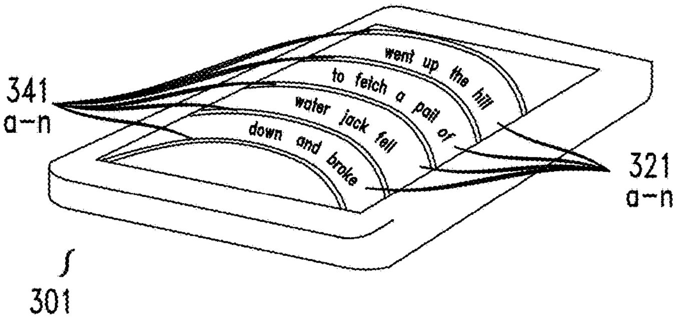
Figure 3E:
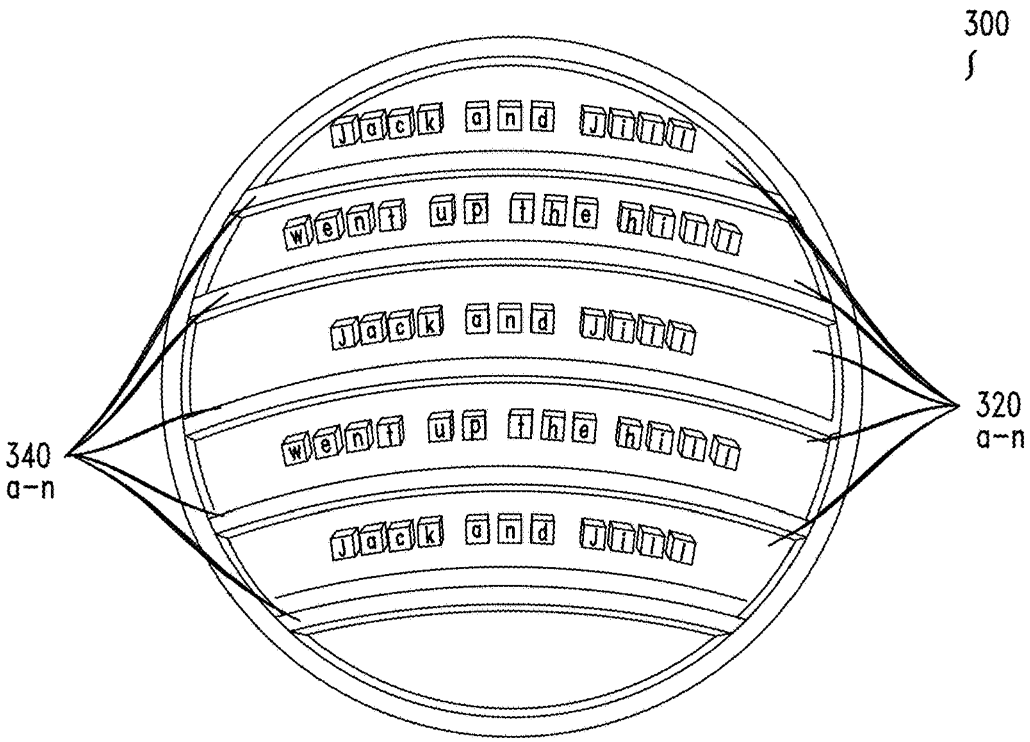
Figure 3F:
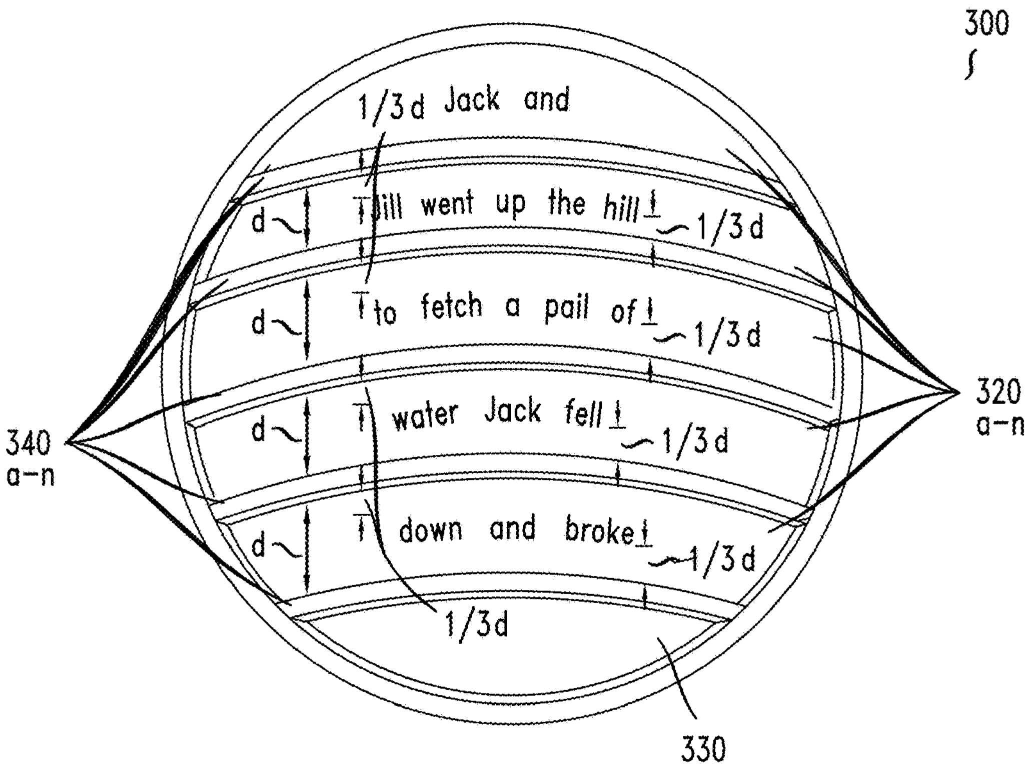

Referring now to FIG. 3F there is depicted an enlarged view of exemplary objects 320*a*-320*n* and exemplary positioned boundaries 340*a*-340*n*. In an embodiment, a preferred positioning of objects 320*a*-320*n* is such that each of the objects is a first distance that is equidistant from a positioned boundary 340*a*-340*n*, where the first distance is ⅓d, where "d" is the second distance between boundaries 340*a*-340*n*, from each curved boundary positioned above and below the object and follows a curved boundary 340*a*-340*n* positioned below the object. In this embodiment the second distance is the total distance between two boundaries. It should be understood that this positioning may be applied to each of the inventive images described herein and covered by the inventive ideas.

Further, separately, in an embodiment, a preferred positioning of objects 320*a*-320*n* is such that each of the objects

320*a*-320*n* is a first distance ½d, where "d" is the second distance between positioned boundaries 340*a*-340*n*, from another object 320*a*-320*n* and follows a curved boundary 340*a*-340*n* positioned below the object. Again, in this embodiment the second distance is the total distance between two boundaries 340*a*-340*n*.

Figure 4A:
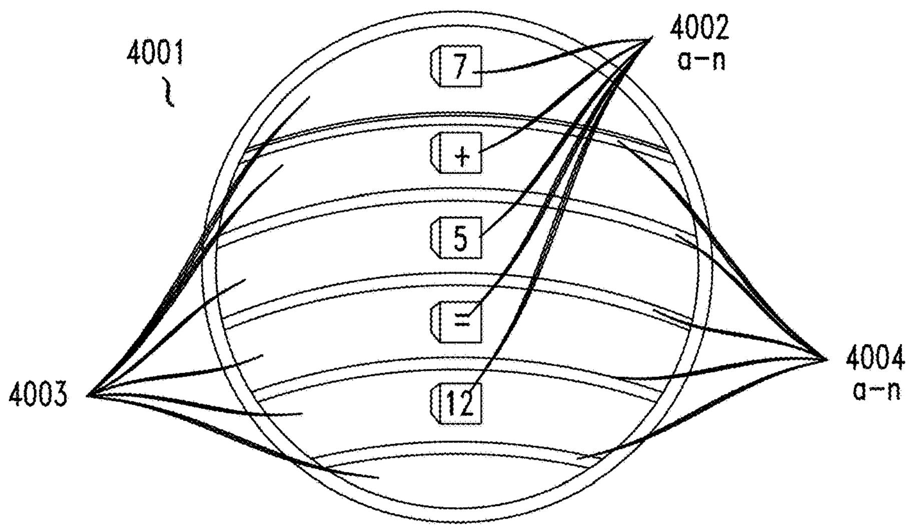
FIGS. 4A to 4C depict, among other things, yet further additional, exemplary inventive images provided in accordance with an embodiment of the invention.
Figure 4B:
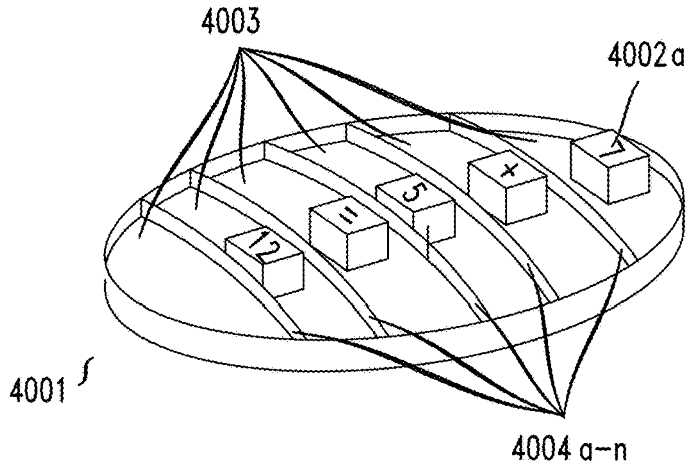
Figure 4C:
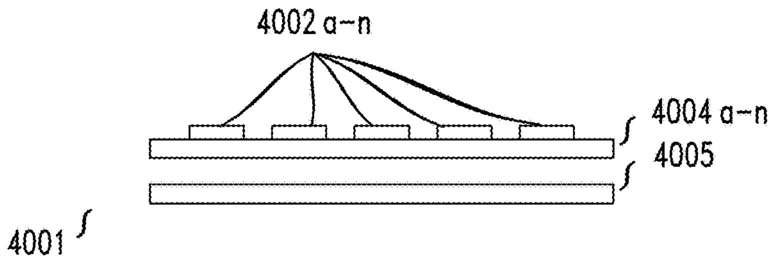

Referring now to FIGS. 4A to 4C there is depicted another exemplary inventive image 4001 generated in accordance with an embodiment of the invention. As shown image 4001 may comprise a surface or background portion 4003, respectively, with positioned non-linear (i.e., curved) boundaries 4004*a*-4004*n* for dividing the image into locations and one or more textual objects 4002*a*-4002*n* (e.g., 3-D objects) representing text, where the text is positioned on the portion such that each object is at a same first distance from the one or more positioned non-linear boundaries 4004*a*-4004*n*. In this embodiment the text comprises mathematical numbers, symbols or operators, for example. By so positioning the textual objects from, and/or along a positioned boundary or boundaries, the image 4001 effectively, visually separates a mathematical number, symbol or operator from another a mathematical number, symbol or operator so that a person with a learning difference, such as a dyslexic, can read and understand the mathematical number, symbol or operator, for example, represented by the image 4001.

Still further, the image 4001 may optionally comprise a 3D border 4004*a* to 4004*n* that corresponds to the circle/oval shape of the image 4001. The border may appear on top of edge of the image 4001.

In one embodiment the first distance may comprise an equal distance from the one or more positioned non-linear boundaries 4004*a*-4004*n*, that are located above and below the one or more objects 4002*a*-4002*n*, to the objects 4002*a*-4002*n*. Alternatively, the first distance may be an equal distance from the positioned non-linear boundaries 4004*a*-4004*n*, which is located above or below the one or more objects 4002*a*-4002*n*, to the objects 4002*a*-4002*n*. Accordingly, the objects 4002*a*-4002*n* may appear to "follow" the positioned non-linear boundaries 4004*a*-4004*n*. Because of the positioning of the textual objects and the boundaries, the image 4001 effectively, visually separates text (e.g., a number, symbol and/or elements thereof) from other text so that a person with a learning difference, such as a dyslexic, can read and understand the text represented by the image 4001.

Though the objects 4002*a*-4002*n* may be a first distance from each of the one or more positioned boundaries 4004*a*-4004*n*, the boundaries 4004*a*-4004*n* themselves may each be separated or positioned from one another by a second distance. In one embodiment, the first distance may be substantially ⅓ of the second distance. In yet another embodiment, one or more of the one or more positioned boundaries 4004*a*-4004*n* may be located above or below each of the one or more objects 4002*a*-4002*n* at a third distance from each of the one or more objects 4002*a*-4002*n*, while another one of the one or more positioned boundaries is located below or above the one or more objects and is at a fourth distance, where the third and fourth distances may be different from each other and may vary from a second distance by up to 10%. Alternatively, the third and fourth distances may be the same distance. Though the exemplary images shown in the figures depict continuous positioned boundaries it should be understood that the boundaries may comprise one or more undulations.

The image 4001 may be generated using the processor in server 500, the various means for creating a dyslexic-friendly readable image in local device 503*b* described herein (including using the types of electronically stored instructions described herein), or by creating a physical device or medium with the understanding that the means for creating a dyslexic-friendly image may comprise one or more processors operable to execute instructions stored as electronic signals in electronic memory (either onboard or separate memory) for converting text from a linear image format to an non-linear, dyslexic-friendly readable image 4001 that includes one or more positioned non-linear boundaries formed as a circular shape, or alternatively, generating the image 4001 formed as a circular shape based on images (image data) stored in memory 504*a*, 504*b*, for example.

Further, once the inventive image 4001 has been generated a processor in either the local device 503*b* or server 500 may be further operable to execute additional, stored instructions to control the forwarding or sending of the so generated image to a printer 501, local printer 503*b*, separate display 502 or to a display that is part of the local device 503*b* so that the converted image may be thereafter reproduced for viewing by a person with a learning difference, such as a dyslexic.

As with the images in FIGS. 1A to 1C, 2A to 2C and 3A to 3E, the image 4001 may be generated by constructing components of a physical device or medium (a device that is primarily mechanical or electro-mechanical, as opposed to electronic), where each component represents an element or part of the image 4001. For example, the components of such a physical device or medium may comprise components corresponding to a background portion 4003, positioned non-linear (i.e., curved) boundaries 4004*a* to 4004*n* (where "n" represents the last boundary) that divides the eventual image into locations, and one or more textual objects 4002*a*-4002*n* representing the text. It should be understood that one or more of the components need not be flat. For example, each of the components representing positioned boundaries 4004*a* to 4004*n* or textual objects 4002*a* to 4002*n* may comprise a raised 3D component (e.g., for a textual object, a physical rectangular block of wood, for example) with a number, symbol, or operator for example, applied to it giving the component a 3D appearance.

The composition of each of the components and the device or medium itself may again be a type of wood, metal, vinyl or plastic, or some combination of such materials, for example. Alternatively one or more of the elements or parts of the image 4001 may be a paint or similar material applied to the surface of the device or medium (e.g., for the positioned non-linear boundaries). Regardless of the device's or medium's or component's composition, in an embodiment the components corresponding to the textual objects 4002*a* to 4002*n* are positioned as described previously—at a first, third or fourth distance from components corresponding to positioned boundaries above and/or below the objects and following a boundary above and/or below the object. The so positioned components from, and/or along, a boundary or boundaries effectively, visually separate a number, symbol, or operator and/or elements thereof from another a number, symbol, or operator so that a person with a learning difference, such as a dyslexic, can read and understand the text (e.g., equation) based on the components.

The component corresponding to the background section 4003 or another supporting section of the physical device or medium may have a perimeter or edge shaped a circle/oval to correspond to the shape of the image 4001.

When the image 4001 is created using such a physical device or medium it may be necessary to apply one or more elements or parts of the image 4001 to individual components of the physical device or medium. For example, each of the textual objects (e.g., numbers, symbols, operators) 4002*a* to 4002*n* may be individually applied/labeled to a physical component of the physical device or medium (e.g., a number, symbol, operator is applied to a 3D block of wood). Thereafter, the so labeled component with its corresponding textual object may be inserted onto the surface of the physical device or medium and positioned along one of the positioned non-linear (i.e., curved) boundaries (similar to lines 4004*a* to 4004*n*) that have also been formed or positioned on the surface of the physical device or medium (e.g., painted on) or as a raised component so that each component is at a first, third or fourth distance from components corresponding to boundaries above and/or below the objects and following a boundary above and/or below the object as noted previously. The positioning of the components corresponding to textual objects 4002*a* to 4002*n* from, and/or along, a boundary or boundaries and the positioning of the boundaries themselves effectively, visually separates a number, symbol or operator and/or elements thereof so represented from another number, symbol or operator so that a person with a learning difference, such as a dyslexic, can read and understand the text represented based on the components. Each of the components corresponding to textual objects 4002*a* to 4002*n* may include means for magnetically attaching the component to the surface 4003.

Figure 6A:
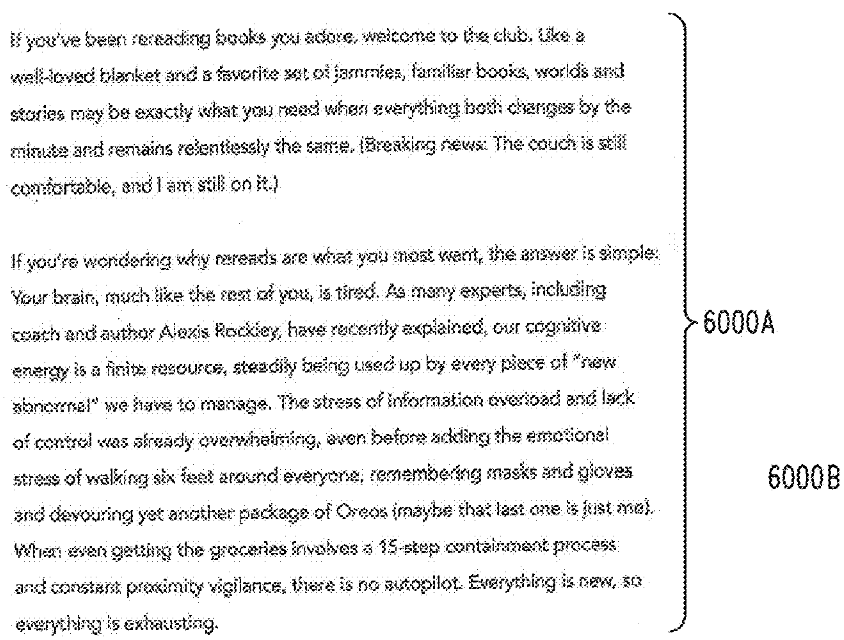
Figure 6B:
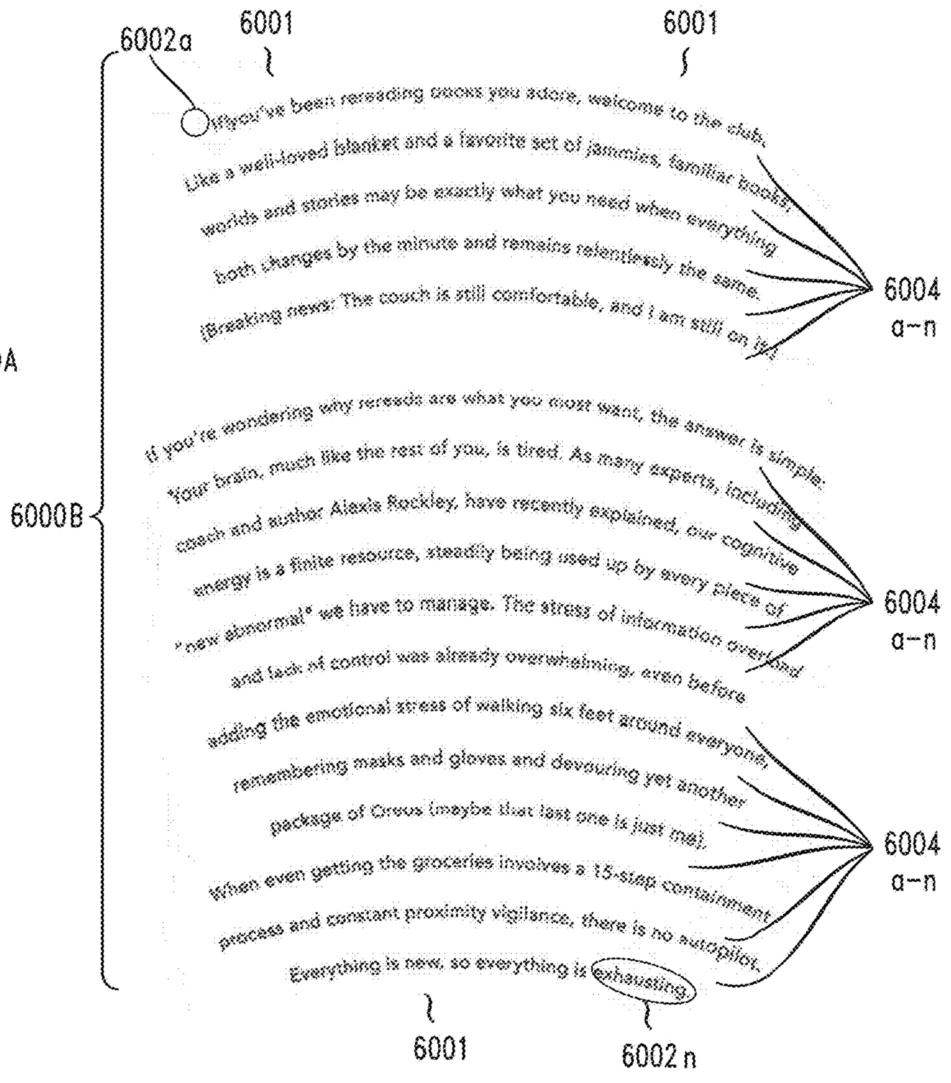

Referring now to FIGS. 6A to 6C there is depicted an exemplary example of the conversion of linear formatted text 6000*a* (e.g., sentences) shown in FIG. 6A into a non-linear formatted dyslexic-friendly readable image 6000*b* in FIGS. 6B and 6C in accordance with the inventive methods and devices described herein (including, but not limited to, using the types of electronically stored instructions described herein), where the image 6000*b* comprises a surface or background portion 6001 comprising one or more positioned non-linear boundaries 6004*a*-6004*n* (where "n" represents the last boundary), one or more textual objects 6002*a*-6002*n* (where "n" represents the last object), and where the one or more textual objects 6002*a*-6002*n* are positioned on the portion 6001 such that each object is at a same first distance from the one or more positioned non-linear boundaries 6004*a*-6004*n*, for example.

FIG. 6C depicts another exemplary example of the conversion of linear formatted text (not shown) into a non-linear formatted, dyslexic-friendly readable image 6005 in accordance with the inventive methods and devices described herein (including, but not limited to, using the types of electronically stored instructions described herein), where the image 6005 comprises an excerpt from the well-known book "Alice In Wonderland". Though only a small excerpt from that book is shown it should be understood that the entire book in linear formatted text can be converted into inventive non-linear formatted, dyslexic-friendly readable images. Continuing, image 6005 may comprise a surface or background portion 6006 comprising one or more positioned non-linear boundaries 6007*a*-6007*n* (where "n" represents the last boundary), one or more textual objects 6008*a*-6008*n* (where "n" represents the last object), and where the one or more textual objects 6008*a*-6008*n* are positioned on the portion 6006 such that each object is at a first distance (e.g., same first distance) from the one or more positioned non-linear boundaries 6007*a*-6007*n*, for example.

In many of the exemplary embodiments described above the linear formatted images were either in existence (e.g., web site) and then converted into non-linear, dyslexic-friendly readable images or created initially by a user using physical objects (e.g., wood blocks). It should be understood that the inventive methods and devices are not limited to such embodiments. Other variations of the inventive methods and devices may be implemented.

For example, when a person with a learning difference, such as a dyslexic, writes, types or otherwise inputs a symbol (e.g., text) that initially appears in a linear format, for example, using an electronic device (e.g., a keyboard, text-to-image device, whiteboard, touchscreen, mousepad, electronic typewriter, or a device that accepts signatures for example) the so inputted symbol may be converted to a non-linear format using an inventive method that, for example, includes a processor that executes stored instructions for at least (i) receiving the linear formatted symbol, (ii) converting the linear formatted symbol into a non-linear, dyslexic-friendly image that includes at least one non-linear boundary, and (iii) displaying the so-converted symbol. Yet further, if necessary, the reverse may occur as well. That is, an image in an inventive non-linear format may be converted or re-converted into a linear format (as needed) by a processor that executes stored instructions for completing such a function. When the input is audible (sounds), an inventive method may additionally incorporate speech-to text processes (e.g., stored, executable instructions) for first converting the spoken words or sounds into a form that can be converted in a non-linear, dyslexic-friendly image described herein.

Figure 7A:
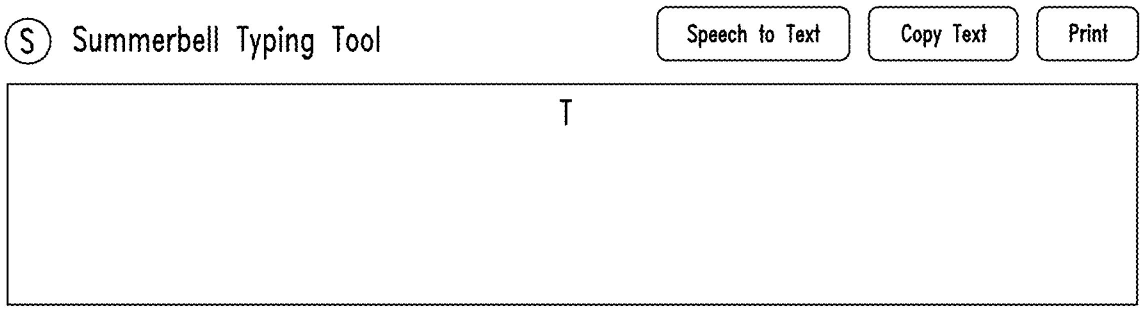
FIGS. 7A to 7I depict examples of the conversion of linear formatted images (e.g., text), that have been typed into an electronic device, into a non-linear formatted, dyslexic-friendly readable image in accordance with embodiments of the invention.
Figure 7B:
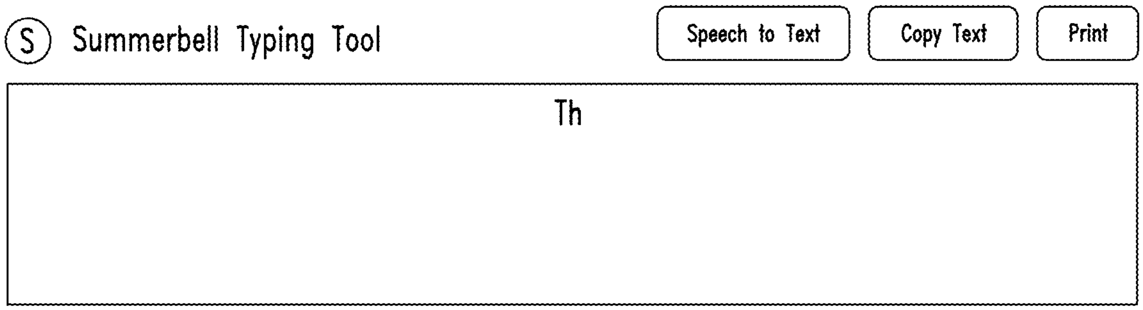
Figure 7C:
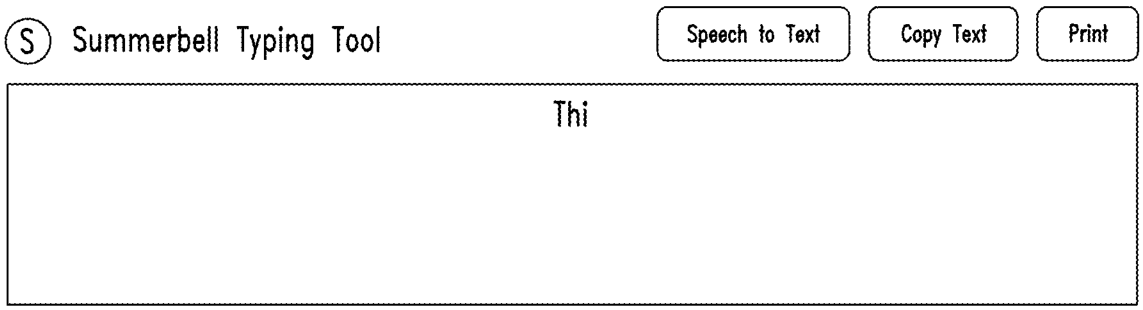
Figure 7D:
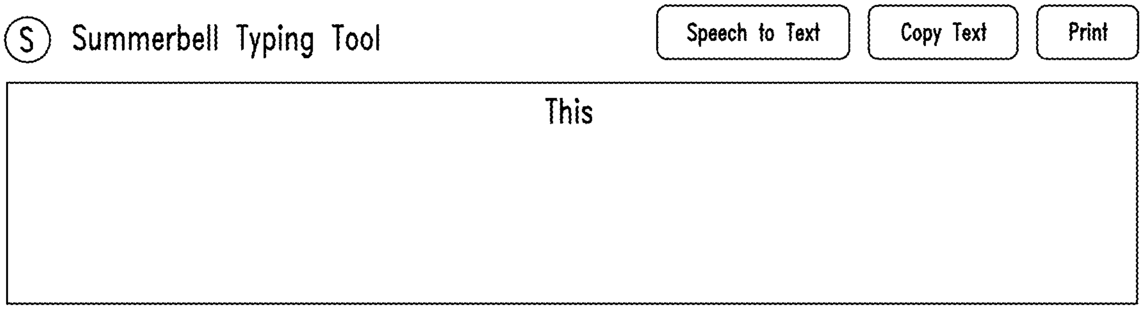
Figure 7E:
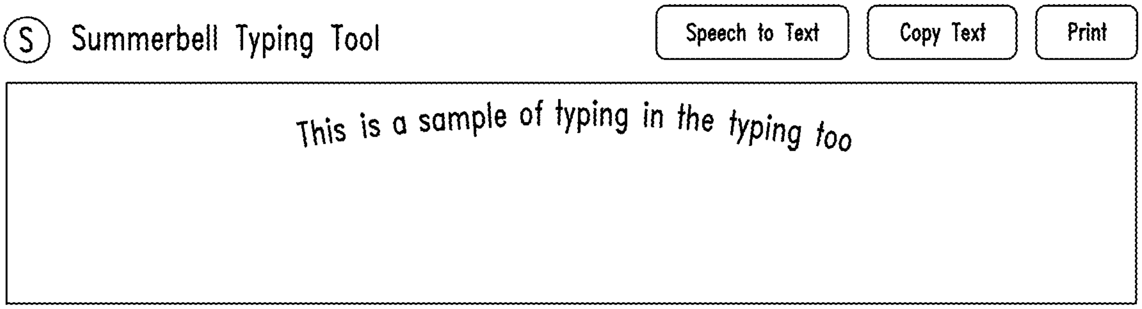
Figure 7F:
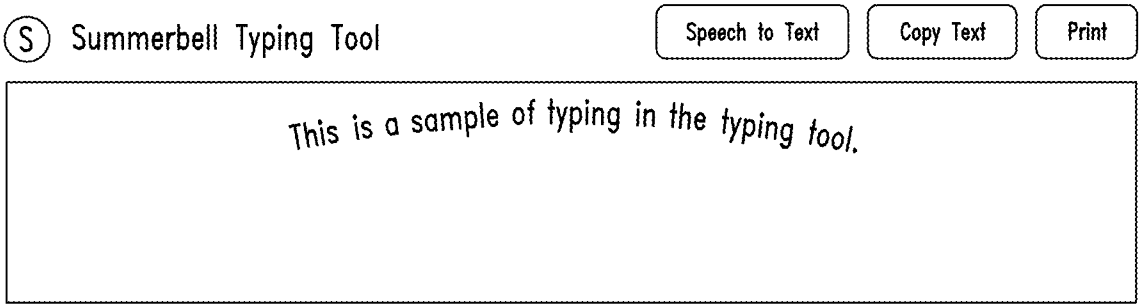
Figure 7G:
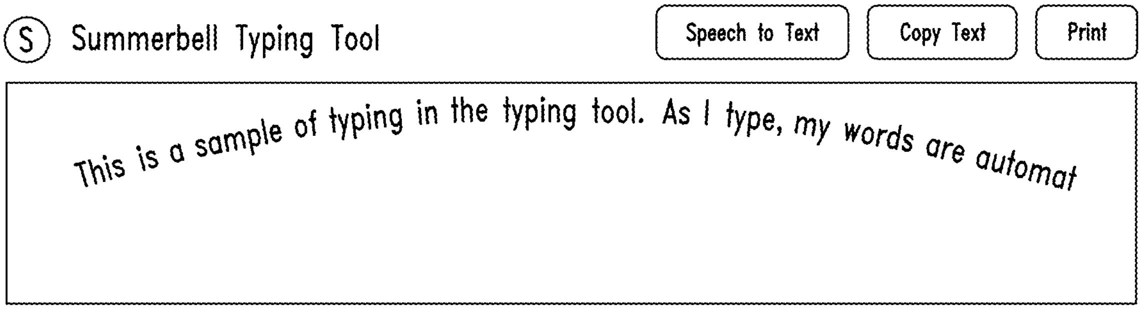

FIGS. 7A to 7I depict illustrative embodiments of a type-to-non-linear text or image methodology according to the invention. In FIG. 7A, a single textual object (e.g., the English language letter "T") is shown after having been typed into a personal computer (e.g., element 503*b* in FIG. 5A), for example, and then electronically shown on the computer's display. In an embodiment, a receiver in the computer 503*b* may be operable to receive signals representing the keys-stroke of the linear formatted letter "T" from a keyboard and then store the signals for processing by a processor in the computer 503*b* or by a server. Thereafter, the processor may be operable to receive the linear formatted letter object (e.g., letter T) and initially position the letter "T" in substantially the middle of the display. Further, in embodiments of the invention the processor will additionally position each additional one or more objects (letters, symbols) that are typed into the computer in the correct sequence following the first object (letter) in a grammatical sequence at an initial position that is also in the middle of the display. Thus, as each additional object (letter) is displayed, the processor is operable to position each preceding displayed object (letter) at a position that is farther from the middle of the display (e.g., positioned one space at a time to the left, for example). Yet further, the processor may position each displayed object such that each object is associated with at least one positioned, non-linear boundary as illustrated in FIGS. 7B to 7F. One example of a first line of a sentence that shows letters (objects) positioned from the center of the display outwards and along a non-linear boundary is depicted in FIG. 7F.

Figure 7H:
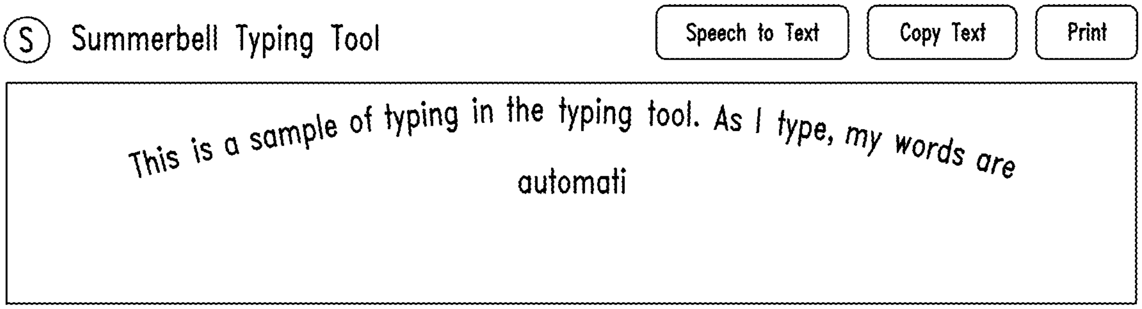

As shown in FIGS. 7A to 7F, a processor may be operable to initially position objects along a first non-linear boundary in their proper grammatical sequence. However, the processor may execute instruction stored in memory to determine whether each next object is a last object that can be fit between vertical margins of the display (margins not shown). Upon determining such a last object, (e.g., the letter "e" in the word "are" in FIG. 7G) the processor may be further operable to execute instructions in memory to begin the next line of the sentence consisting of objects (letters) that have been typed into the computer by a user, for example, by initially positioning each object in substantially the middle of the display as shown in FIG. 7H along a next, positioned non-linear boundary (e.g., the boundary under the first boundary). Thus, as each additional line is displayed, the processor may be operable to position the first object (letter) of each subsequent line at a position that is substantially in the middle of the display, along a positioned non-linear boundary.

Figure 7I:
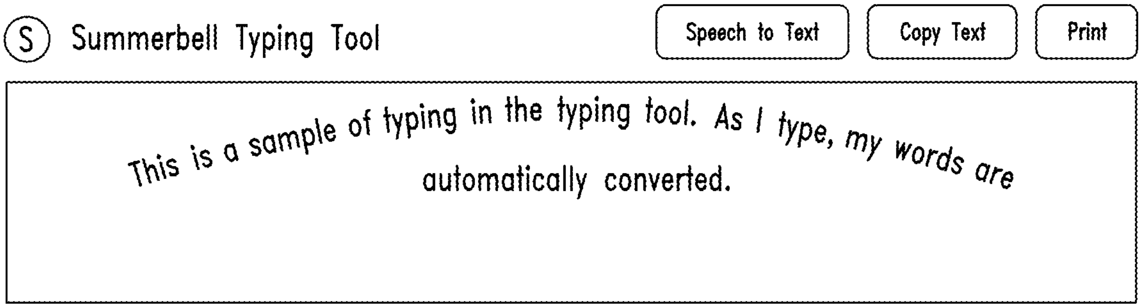

FIG. 7I depicts two lines of grammatically sequenced letters (objects) along non-linear boundaries that have been positioned as described above after their corresponding linear versions were first typed into a keyboard of a computer, for example.

It should be understood that the images in FIGS. 7A to 7I also include a surface or background portion (not labeled for the sake of clarity), where one or more textual objects (e.g., the letters in each line in FIGS. 7A to 7I) are positioned such that each object is at a first distance (as described previously herein) from its associated, positioned non-linear boundary. Still further, such a first distance may be an equal distance from one or more positioned non-linear boundaries that are located above and/or below the one or more objects, where each of the one or more positioned boundaries is separated by a second distance, and the first distance is substantially ⅓ of the second distance.

It should be understood that the positioning of each letter initially in the middle of the display is merely one method of displaying letters in a non-linear format that have been input (typed) in a computer. Another inventive method positions each letter at an initial position that is not in the middle of the display (e.g., slightly off-center).

The description above has focused on exemplary embodiments for converting linear formatted images and their constituent text, symbols into non-linear, dyslexic-friendly readable images. While certain embodiments have been described it should be understood that the inventive methods and devices are not limited to the described embodiments. Other variations of the inventive methods and devices may be implemented.

It should be understood that the features described above with respect to one embodiment illustrated by one figure, for example, may also be incorporated into another embodiment described herein and/or shown in a different figure. For the sake of clarity, however, such features have not been repeated for each other embodiment.

Numerous changes and modifications to the embodiments disclosed herein may be made without departing from the general spirit of the invention, the scope of which is best defined by the claims that follow.

We claim:

1. A method for converting linear formatted text into a non-linear, dyslexic-friendly readable text image using an electronic device comprising:

electronically reading or receiving linear formatted text;

serially converting characters from the linear formatted text into corresponding textual objects, a plurality of said textual objects positioned onto a non-linear, dyslexic-friendly readable text image using an electronic device, where said non-linear, dyslexic-friendly readable text image comprises, (i) a surface or background portion;

(ii) a plurality of non-linear boundaries disposed on said surface and each aligned about a middle or center part thereof, wherein each said non-linear boundary is a curved line on said surface, each non-linear boundary on said surface having the same non-zero slope and parallel, and (iii) said plurality of textual objects, said plurality of said textual objects created from said linear formatted text and serially disposed on said surface are adjacent to given non-linear boundaries of said plurality of non-linear boundaries, and centered along a given curved line between said given non-linear boundaries; and displaying, on a display, said surface and said plurality of said textual objects disposed on said surface said plurality of said textual objects centered along said given curved line and between said given non-linear boundaries, wherein a top part of a given textual object of said plurality of said textual objects is at a first distance from a first of said given non-linear boundaries positioned on said surface and above said given textual object, wherein a bottom part of said given textual object of said plurality of said textual objects is at said first distance from a second of said given non-linear boundaries positioned on said surface and below said given textual object, wherein said first and second given non-linear boundaries are separated by a second distance, said first distance being substantially one third of said second distance, wherein said plurality of said textual objects serially disposed between said given non-linear boundaries along said given curved line, when greater than a line margin, spill over to another given curved line below said given curved line, said another given curved line receiving further serially disposed textual objects, and wherein said given curved line and said another given curved line are not visible to a user on the display, and said plurality of non-linear boundaries may or may not be visible to the user on the display.

2. The method according to claim 1, further comprising: adjusting a slope of said plurality of non-linear boundaries.

3. The method according to claim 1, further comprising:

electronically selecting one or more textual objects within the non-linear, dyslexic-friendly readable text image;

electronically presenting a list of functional or informative indicators;

electronically selecting an indicator from the list; and completing a function or displaying information associated with the selected indicator.

4. The method according to claim 3, further comprising:

presenting a definition for said one or more textual objects so selected.

5. The method according to claim 1, further comprising:

electronically selecting one or more textual objects within the non-linear, dyslexic-friendly readable text image; and emphasizing the one of more selected textual objects.

6. The method according to claim 5, further comprising:

de-emphasizing non-selected textual objects within the non-linear, dyslexic-friendly readable text image.

7. The method according to claim 1, further comprising:

displaying an edit indicator;

selecting a textual object from said plurality of textual objects to be edited; and editing the textual object.

8. The method as in according to claim 7, further comprising:

visually indicating the selected textual object is being edited by presenting an image editing indicator.

9. The method as in according to claim 7, further comprising:

re-converting the non-linear, dyslexic-friendly text image to the linear formatted text.

10. The method according to claim 1, wherein said plurality of textual objects comprises one or more of grammatical letters, words, numbers, or symbols.

11. The method according to claim 10, wherein a given grammatical letter, word or symbol comprises a character in a language.

12. An electronic device operable to convert linear formatted text into a non-linear, dyslexic-friendly readable text image comprising:
- an electronic processor operable to execute stored instructions to:
  - electronically read or receive characters from said linear formatted text;
  - serially convert said characters from the linear formatted text into corresponding textual objects, a plurality of said textual objects positioned onto a non-linear, dyslexic-friendly readable text image, where said non-linear, dyslexic-friendly readable text image for display created by said electronic processor comprises,
  - a surface or background portion;
  - a plurality of non-linear boundaries disposed on said surface and each aligned about a middle or center part thereof, wherein each said non-linear boundary is a curved line on said surface, each non-linear boundary on said surface having the same non-zero slope and parallel, and
  - said plurality of textual objects, created from said linear formatted text and serially disposed on said surface are adjacent to given non-linear boundaries of said plurality of non-linear boundaries, and centered along a given curved line between said given non-linear boundaries; and
  - display, on a display, said surface and said plurality of said textual objects disposed on said surface, said plurality of said textual objects centered along said given curved line and between said given non-linear boundaries,
  - wherein a top part of a given textual object of said plurality of said textual objects is at a first distance from a first of said given non-linear boundaries positioned on said surface and above said given textual object,
  - wherein a bottom part of said given textual object of said plurality of said textual objects is at said first distance from a second of said given non-linear boundaries positioned on said surface and below said given textual object,
  - wherein said first and second given non-linear boundaries are separated by a second distance, said first distance being substantially one third of said second distance,
  - wherein said plurality of said textual objects serially disposed between said given non-linear boundaries along said given curved line, when greater than a line margin, spill over to another given curved line below said given curved line, said another given curved line receiving further serially disposed textual objects, and
  - wherein said given curved line and said another given curved line are not visible to a user on the display, and said plurality of non-linear boundaries may or may not be visible to the user on the display.

13. The electronic device according to claim 12, wherein the electronic processor is further operable to execute stored instructions to adjusting a slope of said plurality of non-linear boundaries.

14. The electronic device according to claim 12, wherein the electronic processor is further operable to execute stored instructions to:
- select one or more textual objects within the non-linear, dyslexic-friendly readable text image;
- present a list of functional or informative indicators;
- select an indicator from the list; and
- complete a function or display information associated with selected indicator.

15. The electronic device according to claim 14, wherein the electronic processor is further operable to execute stored instructions to present a definition of the selected one or more textual objects.

16. The electronic device according to claim 12, wherein the electronic processor is further operable to execute stored instructions to:
- select one or more textual objects within the non-linear, dyslexic-friendly readable text image; and
- emphasize the one of more selected textual objects.

17. The electronic device according to claim 12, wherein the electronic processor is further operable to execute stored instructions to de-emphasize non-selected textual objects within the non-linear, dyslexic-friendly readable text image.

18. The electronic device according to claim 12, wherein the electronic processor is further operable to execute stored instructions to:
- display an edit indicator;
- select a textual object from the one or more textual objects to be edited; and
- edit the textual object.

19. The electronic device according to claim 18, wherein the electronic processor is further operable to execute stored instructions to visually indicate the selected textual object is being edited by presenting an image editing indicator.

20. The electronic device according to claim 19, wherein the electronic processor is further operable to execute stored instructions to re-convert the non-linear, dyslexic-friendly text image to the linear formatted text.

21. The electronic device according to claim 12, wherein said plurality of textual objects comprises one or more of grammatical letters, words, numbers, or symbols.

22. The electronic device according to claim 21, wherein a given grammatical letter, word or symbol comprises a character in a language.

23. A method for creating a dyslexic-friendly image comprising:
- receiving a text input, said text input comprising a plurality of linear formatted characters;
- serially converting, by a processor, said linear formatted characters into corresponding textual objects;
- creating a plurality of non-linear boundaries on a display, each aligned about a middle or center part thereof, each said non-linear boundary is a curved line, with each curved line having the same non-zero slope and parallel, and
- serially displaying said textual objects on said display, said textual objects being centrally aligned on said display between given non-linear boundaries, and centered along a given curved line between said given non-linear boundaries, said textual objects being positioned non-linearly along said given curved line,
- wherein a top part of a given textual object of said textual objects is at a first distance from a first of said given non-linear boundaries positioned on said display and above said given textual object,
- wherein a bottom part of a said given textual object of said textual objects is at said first distance from a second of said given non-linear boundaries positioned on said surface and below said given textual object, wherein said textual objects serially disposed between said given non-linear boundaries along said given curved line, when greater than a line margin, spill over to another given curved line below said given curved line, said another given curved line receiving further serially disposed textual objects, wherein said first and second given aligned non-linear boundaries are separated by a second distance, said first distance being substantially one third of said second distance, and wherein said given curved line and said another given curved line are not visible to a user on said display, and said plurality of non-linear boundaries may or may not be visible to the user on said display, whereby said text input is converted to said dyslexic-friendly image.

24. A system operable to create a dyslexic-friendly image, comprising:

a receiver, said receiver reading or receiving a text input, said text input comprising a plurality of linear formatted characters;

a processor, said processor serially converting said linear formatted characters into corresponding textual objects; and a display, said display having a plurality of non-linear boundaries disposed thereon, each said non-linear boundary aligned about a middle or center part thereof, each non-linear boundary on said display having the same non-zero slope and parallel, wherein serially created textual objects are serially disposed on said display, said textual objects being centrally and non-linearly aligned on a given curved line between given non-linear boundaries, said textual objects non-linearly positioned along said given curved line, wherein a top part of a given textual object of said textual objects is at a first distance from a first of said given non-linear boundaries positioned on said display and above said given textual object, wherein a bottom part of a said given textual object of said textual objects is at said first distance from a second of said given non-linear boundaries positioned on said surface and below said given textual object, wherein said textual objects serially disposed between said given non-linear boundaries along said given curved line, when greater than a line margin, spill over to another given curved line below said given curved line, said another given curved line receiving further serially disposed textual objects, wherein said first and second given aligned non-linear boundaries are separated by a second distance, said first distance being substantially one third of said second distance, and wherein said given curved line and said another given curved line are not visible to a user on said display, and said plurality of non-linear boundaries may or may not be visible to the user on said display, whereby said text input is converted to said dyslexic-friendly image.

* * * * *